United States Patent
Kobayashi

(10) Patent No.: US 12,137,308 B2
(45) Date of Patent: Nov. 5, 2024

(54) IMAGE PROCESSING APPARATUS

(71) Applicant: DENSO CORPORATION, Kariya (JP)

(72) Inventor: Kazuhiko Kobayashi, Kariya (JP)

(73) Assignee: DENSO CORPORATION, Kariya (JP)

( * ) Notice: Subject to any disclaimer, the term of this patent is extended or adjusted under 35 U.S.C. 154(b) by 55 days.

(21) Appl. No.: 18/181,331

(22) Filed: Mar. 9, 2023

(65) Prior Publication Data

US 2023/0291880 A1 Sep. 14, 2023

(30) Foreign Application Priority Data

Mar. 14, 2022 (JP) .................................. 2022-039327

(51) Int. Cl.
| | |
|---|---|
| *H04N 9/77* | (2006.01) |
| *H04N 23/71* | (2023.01) |
| *H04N 23/76* | (2023.01) |
| *H04N 23/84* | (2023.01) |

(52) U.S. Cl.
CPC ............... *H04N 9/77* (2013.01); *H04N 23/71* (2023.01); *H04N 23/76* (2023.01); *H04N 23/84* (2023.01)

(58) Field of Classification Search
CPC .......... H04N 9/77; H04N 23/76; H04N 23/71; H04N 23/84
See application file for complete search history.

(56) References Cited

U.S. PATENT DOCUMENTS

| | | | | |
|---|---|---|---|---|
| 7,804,980 B2* | 9/2010 | Sasaki | .................... | G06V 20/56 |
| | | | | 382/217 |
| 10,228,699 B2* | 3/2019 | Murao | .................... | H04N 23/73 |
| 10,582,176 B2* | 3/2020 | Qiu | ......................... | H04N 9/793 |
| 11,323,677 B2* | 5/2022 | Tian | ........................ | H04N 23/71 |
| 11,350,048 B1* | 5/2022 | Magnani | ................ | H04N 25/75 |
| 11,367,168 B2* | 6/2022 | Koshisaka | ............. | G06V 20/56 |
| 11,375,128 B2* | 6/2022 | Liu | ............................ | G06T 5/90 |
| 11,509,875 B1* | 11/2022 | Herman | ............... | H04N 23/745 |
| 11,653,118 B2* | 5/2023 | Cote | .................... | H04N 25/133 |
| | | | | 348/242 |
| 11,962,917 B2* | 4/2024 | Yuan | ..................... | H04N 9/646 |

(Continued)

FOREIGN PATENT DOCUMENTS

JP 2012-156715 A 8/2012

*Primary Examiner* — Brian P Yenke
(74) *Attorney, Agent, or Firm* — MASCHOFF BRENNAN

(57) ABSTRACT

In an image processing apparatus, an image corrector ascertains, for each pixel of a selected pixel region included in an image captured by an imaging unit, luminance-value ratios of respective colors of color filters in accordance with (i) a color luminance value of the corresponding pixel of the selected pixel region, and (ii) ascertainment data items predetermined for the respective colors if a measured illumination level around the imaging unit is lower than or equal to a predetermined threshold illumination level. The ascertainment data item, predetermined for each color, represents a corresponding color luminance-value ratio at any pixel in the selected pixel region with respect to a predetermined peak luminance value of the corresponding color in the selected pixel region. The image corrector generates a corrected image in accordance with the luminance-value ratios of the respective colors ascertained for each pixel of the selected pixel region.

8 Claims, 8 Drawing Sheets

(56) References Cited

U.S. PATENT DOCUMENTS

| | | | |
|---|---|---|---|
| 2009/0021601 A1* | 1/2009 | Tanaka | H04N 23/76 348/222.1 |
| 2010/0102990 A1* | 4/2010 | Kamioka | G01J 1/18 348/E5.022 |
| 2011/0102581 A1* | 5/2011 | Nakamura | H04N 17/002 348/135 |
| 2014/0184800 A1* | 7/2014 | Hirai | G02B 5/3025 348/148 |
| 2014/0293055 A1 | 10/2014 | Otsuka | |
| 2015/0103144 A1* | 4/2015 | Shibazaki | H04N 13/218 348/46 |
| 2016/0140697 A1 | 5/2016 | Sugimoto et al. | |
| 2016/0280229 A1* | 9/2016 | Kasahara | G06V 10/141 |
| 2017/0374260 A1* | 12/2017 | Ichikawa | G01J 3/28 |
| 2018/0010966 A1* | 1/2018 | Ichikawa | H04N 1/6041 |
| 2019/0182458 A1* | 6/2019 | Kawano | H04N 9/77 |
| 2019/0297310 A1* | 9/2019 | Wang | H04N 23/70 |
| 2019/0347773 A1 | 11/2019 | Naruse et al. | |
| 2019/0385542 A1* | 12/2019 | Yang | G09G 3/3648 |
| 2022/0174245 A1* | 6/2022 | Jones | H04N 23/71 |
| 2022/0174250 A1* | 6/2022 | Kim | H04N 9/77 |
| 2022/0239881 A1* | 7/2022 | Cheng | H04N 9/77 |
| 2023/0079582 A1* | 3/2023 | Zhao | H04N 9/646 382/155 |
| 2023/0239580 A1* | 7/2023 | Hirasawa | H04N 23/71 348/222.1 |
| 2023/0326177 A1* | 10/2023 | Koshisaka | G06V 10/60 382/274 |
| 2024/0145518 A1* | 5/2024 | Yahata | H04N 25/135 |
| 2024/0147081 A1* | 5/2024 | Jeong | H04N 23/76 |
| 2024/0196104 A1* | 6/2024 | Taylor | G06T 7/90 |

\* cited by examiner

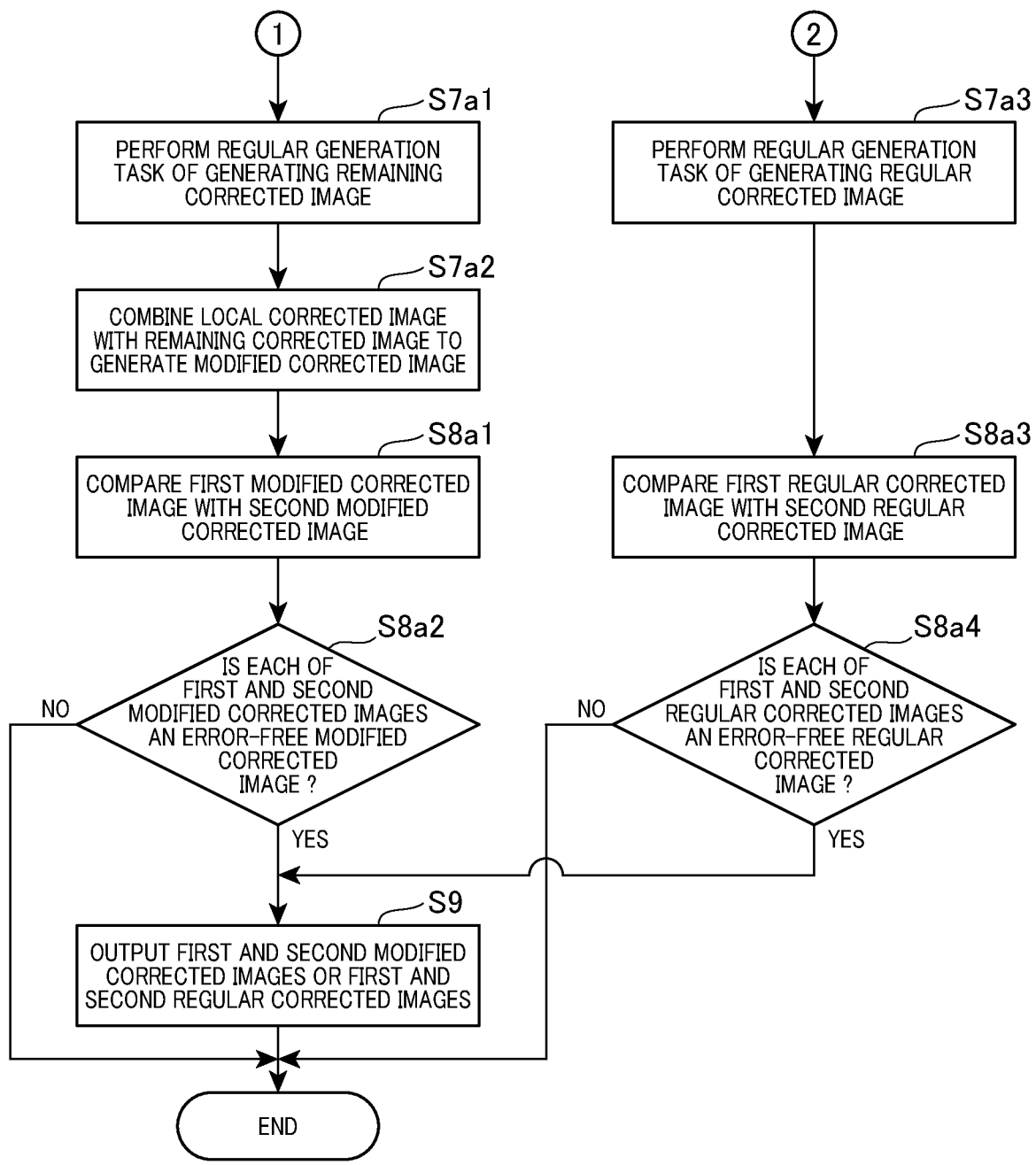

IMAGE PROCESSING APPARATUS

CROSS REFERENCE TO RELATED APPLICATION

This application is based on and claims the benefit of priority from Japanese Patent Application No. 2022-039327 filed on Mar. 14, 2022, the disclosure of which is incorporated in its entirety herein by reference.

TECHNICAL FIELD

The present disclosure relates to image processing apparatuses used to be installed in a mobile object, such as a vehicle.

BACKGROUND

Various image processing apparatuses have been proposed, each of which is used to be installed in a mobile object, such as a vehicle. A typical one of these image processing apparatuses, which is disclosed in Japanese Patent Application Publication No. 2013-107476, includes an imaging unit. The imaging unit is comprised of a plurality of photodiodes and a color filter array. The photodiodes are arranged in a two-dimensional array. The color filter array is comprised of a plurality of red (R), green (G), and blue (B) filters that are two-dimensionally arranged to respectively overlay the photodiodes.

Bayer arrangement, i.e., Bayer matrix pattern, is preferably used to two-dimensionally arrange the red, green, and blue filters. The red, green, and blue filters, which are arranged to have the Bayer arrangement, consist of 2×2 group of filters, and, for every 2×2 group of filters, two diagonally opposed filters are green filters, while one of the other filters is a red filter, and the other thereof is a blue filter.

SUMMARY

In an image processing apparatus, an image corrector ascertains, for each pixel of a selected pixel region included in an image captured by an imaging unit, luminance-value ratios of respective colors of color filters in accordance with (i) a color luminance value of the corresponding pixel of the selected pixel region, and (ii) ascertainment data items predetermined for the respective colors if a measured illumination level around the imaging unit is lower than or equal to a predetermined threshold illumination level. The ascertainment data item, predetermined for each color, represents a corresponding color luminance-value ratio at any pixel in the selected pixel region with respect to a predetermined peak luminance value of the corresponding color in the selected pixel region. The image corrector generates a corrected image in accordance with the luminance-value ratios of the respective colors ascertained for each pixel of the selected pixel region.

BRIEF DESCRIPTION OF THE DRAWINGS

Other aspects of the present disclosure will become apparent from the following description of embodiments with reference to the accompanying drawings in which:

FIG. 10B is a second remaining part of the flowchart.

DETAILED DESCRIPTION OF EMBODIMENTS

Figure 1:
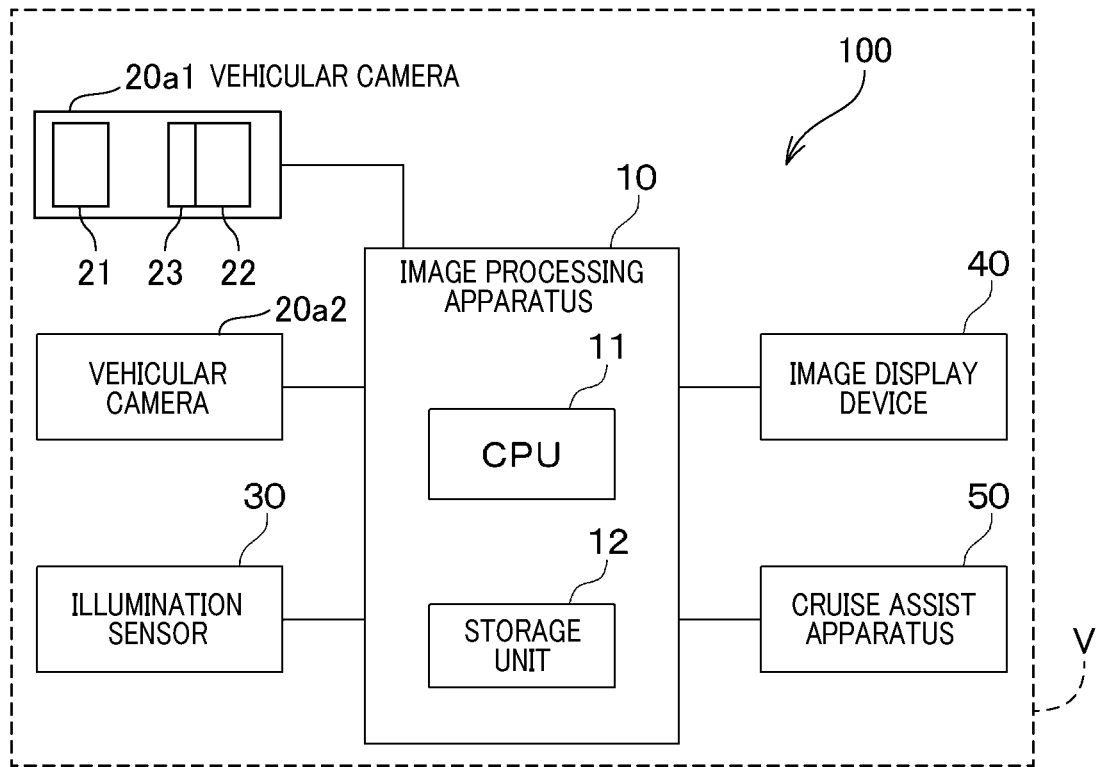
FIG. 1 is a block diagram schematically illustrating an example of the schematic structure of an imaging processing system, which includes an image processing apparatus according to an exemplary embodiment of the present disclosure.

As described above, a typical imaging unit used for an image processing apparatus installable in a mobile object includes a plurality of photodiodes and a color filter unit.

The photodiodes are arranged in a two-dimensional array. The color filter unit is comprised of a plurality of red, green, and blue filters that are two-dimensionally arranged to respectively overlay the photodiodes. The red filter is sensitive to red light within a red-wavelength band, and the green filter is sensitive to green light within a green-wavelength band, and the blue filter is sensitive to blue light within a blue-wavelength band.

Such an imaging unit comprised of two-dimensionally arrayed photodiodes and a color filter unit whose RGB filters arranged to overlay the respective photodiodes will be referred to as a color-filter imaging unit, and the photodiodes overlayed by the respective red, green, and blue filters will be referred to as red-, green-, and blue-filtered photodiodes (color-filtered photodiodes).

An image captured by the color-filter imaging unit based on light entering the color-filter imaging unit is comprised of pixels corresponding to the respective color-filtered photodiodes.

Specifically, an image captured by the color-filter imaging unit is comprised of
  (i) Red pixels, each of which has a corresponding red luminance value based on red light sensed by the corresponding red-filtered photodiode
  (ii) Green pixels, each of which has a corresponding green luminance value based on green light sensed by the corresponding green-filtered photodiode
  (iii) Blue pixels, each of which has a corresponding blue luminance value based on blue light sensed by the corresponding blue-filtered photodiode That is, each red pixel in a captured image therefore represents the intensity of red light without representing the intensity of green light and that of blue light. The same goes for each green pixel and for each blue pixel.

For this reason, such an image processing apparatus performs a method of ascertaining, for each pixel of a captured image, a luminance value of the color of the corresponding pixel and luminance values of the other colors.

For example, an averaging method, which is an example of the ascertaining method, includes
  (I) Ascertaining, as a red luminance value of each red pixel of a captured image, a luminance value sensed by the corresponding red-filtered photodiode
  (II) Ascertaining, as a green luminance value of each red pixel of the captured image, an average value of green luminance values of the green pixels located adjacently around the corresponding red pixel
  (III) Ascertaining, as a blue luminance value of each red pixel of the captured image, an average value of blue luminance values of the blue pixels located adjacently around the corresponding red pixel That is, the averaging method ascertains, as a selected color luminance value of each pixel whose color is different from the selected color luminance value, an average value of selected-color luminance values of selected-color pixels located adjacently around the corresponding pixel.

Then, the image processing apparatus can be configured to calculate, for each pixel of the captured image, the ratio of (i) the red luminance value ascertained for the corresponding pixel, (ii) the green luminance value ascertained for the corresponding pixel, and (iii) blue luminance value ascertained for the corresponding pixel. The image processing apparatus can be configured to generate a corrected image of the captured image based on the ratio of (i) the red luminance value ascertained for each pixel, (ii) the green luminance value ascertained for the corresponding pixel, and (iii) blue luminance value ascertained for the corresponding pixel.

Then, the image processing apparatus can be configured to output, to an image display device and/or a cruise-assist apparatus installed in the corresponding mobile object, the corrected image. This enables the image display device and/or the cruise-assist apparatus to recognize colors of the corrected image in accordance with the ratio of (i) the red luminance value ascertained for each pixel of the corrected image, (ii) the green luminance value ascertained for the corresponding pixel, and (iii) blue luminance value ascertained for the corresponding pixel. The ratio of (i) the red luminance value for each pixel of a corrected image, (ii) the green luminance value for the corresponding pixel, and (iii) the blue luminance value for the corresponding pixel will be hereinafter referred to as an RGB luminance-value ratio for each pixel of a corrected image.

Recent higher level of imaging performance of a color-filter imaging unit results in farther objects from the imaging unit being capturable by the imaging unit. This may cause a situation where light reflected from an object does not enter all the photodiodes uniformly but enters particular photodiodes in the color-filter imaging unit. In particular, let us assume that the color-filter imaging unit is used under a dark condition, i.e., a low light condition, such as used during a night-time period. In this assumption, light reflected from a distant taillamp or a distant reflector from the color-filter imaging unit is likely to enter particular several photodiodes in the imaging unit, such as a particular one photodiode, particular two photodiodes, or particular three photodiodes.

As described above, the averaging method ascertains, as a selected color luminance value for each pixel whose color is different from the selected color luminance value, an average value of selected-color luminance values of selected-color pixels located adjacently around the corresponding pixel.

For this reason, the averaging method is efficient for a case where light reflected from an object enters the overall photodiodes of the color-filter imaging unit. In contrast, for another case where light reflected from an object enters one or more particular photodiodes of the color-filter imaging unit, the averaging method may be however likely to be inefficient due to lower accuracy of ascertained luminance values. This is because luminance values of the one or more particular photodiodes are greater than those of the other photodiodes. This may therefore be likely to result in a reduction in the accuracy of ascertaining the RGB luminance-value ratio for each pixel of a corrected image.

In view of the circumstances set forth above, an aspect of the present disclosure seeks to provide image processing apparatuses, each of which is capable of improving the accuracy of ascertaining an RGB luminance-value ratio for each pixel of a corrected image.

An image processing apparatus according to an exemplary measure of the present disclosure includes an image processing apparatus. The image processing apparatus includes an image obtainer configured to obtain, from an imaging unit comprised of a color filter unit, an image captured by the imaging unit, the color filter unit being comprised of a plurality of color filters whose colors are different from each other. The image is comprised of a plurality of pixels arranged to respectively correspond to the color filters. Each of the plurality of pixels has a corresponding color luminance value. The image processing apparatus includes an illumination-level determiner configured to measure an illumination level around the imaging unit, and determine whether the measured illumination level around the camera is lower than or equal to a predetermined threshold illumination level.

The image processing apparatus includes an image corrector configured to perform, for the image, a corrected-image generation task of ascertaining, for each pixel of a selected pixel region included in the image, luminance-value ratios of the respective colors of the color filters in accordance with (i) the color luminance value of the corresponding pixel of the selected pixel region, and (ii) ascertainment data items predetermined for the respective colors if it is determined that the measured illumination level around the imaging unit is lower than or equal to the predetermined threshold illumination level.

The ascertainment data item, predetermined for each of the colors, represents a corresponding color luminance-value ratio at any pixel in the selected pixel region included in the image with respect to a predetermined peak luminance value of the corresponding one of the colors in the selected pixel region.

The image corrector is configured to generate a corrected image in accordance with the luminance-value ratios of the respective colors ascertained for each pixel of the selected pixel region.

The image processing apparatus is therefore configured to ascertain, for each pixel of a selected pixel region included in the image captured by the imaging unit, the luminance-value ratios of the respective colors of the color filters in accordance with (i) the color luminance value of the corresponding pixel of the selected pixel region, and (ii) ascertainment data items predetermined for the respective colors.

This configuration therefore obtains, for each color, the luminance-value ratio for each pixel of the selected pixel region independently of the color-sensitivity difference caused by the color filter unit, resulting in the respective color luminance-value ratios of each pixel of the selected pixel region showing color differences of the corresponding pixel under the same brightness condition.

This therefore makes it possible to improve the accuracy of ascertaining the respective color luminance-value ratios for each pixel of the selected pixel region.

The following describes specific exemplary embodiments of the present disclosure with reference to the accompanying drawings. In the exemplary embodiments and their modifications, like parts between the exemplary embodiments and their modifications are omitted or simplified to avoid redundant description.

The exemplary embodiments embody an inventive concept as an image processing apparatus that constitutes an image processing system for capturing images and performing various tasks based on the captured images. Preferably, the image processing system can be designed to be installable in a mobile object, such as a vehicle. Preferably, the image processing apparatus, an image capturing unit, an image output unit, and a cruise assist apparatus can constitute the image processing system.

In particular, an exemplary embodiment included in the exemplary embodiments relates to an image processing system 100 installed in a vehicle V, which is an example of a mobile object.

Specifically, the image processing system 100 according to the exemplary embodiment installed in the vehicle V includes, as illustrated in FIG. 1, an image processing apparatus 10, a first vehicular camera 20a1, a second vehicular camera 20a2, an illumination level sensor 30, an image display device 40, and a cruise assist apparatus 50. The first and second vehicular cameras 20a1 and 20a2, illumination level sensor 30, image display device 40, and cruise assist apparatus 50 are communicably connected to the image processing apparatus 10 via wires and/or radios.

Each of the first and second vehicular cameras 20a1 and 20a2 is comprised of, for example, a lens system 21 having a predetermined optical axis, a complementary metal-oxide-semiconductor (CMOS) image sensor 22, and a color filter unit 23; the CMOS image sensor 22 serves as an imaging device.

The first and second vehicular cameras 20a1 and 20a2 are located adjacently to the front windshield of the vehicle V such that (I) the first and second vehicular cameras 20a1 and 20a2 are aligned in a width direction of the vehicle V with a predetermined interval therebetween and (II) the optical axis of the lens system 21 of each of the first and second vehicular cameras 20a1 and 20a2 is directed toward the forward side of the vehicle V.

The CMOS image sensor 22 is comprised of a plurality of photodiodes arranged in a two-dimensional array.

The color filter unit 23 is comprised of a plurality of red (R), green (G), and blue (B) filters that are two-dimensionally arranged in a two-dimensional array to respectively overlay the photodiodes of the CMOS image sensor 22.

For example, the red, green, and blue filters of the color filter unit 23 according to the exemplary embodiment are arranged to have Bayer matrix pattern. Specifically, the red, green, and blue filters, which are arranged to have the Bayer matrix pattern, consist of 2×2 group of filters, and, for every 2×2 group of filters, two diagonally opposed filters are green filters (G), while one of the other filters is a red filter (R), and the other thereof is a blue filter (B) (see FIG. 2). The red, green, and blue filters of the color filter unit 23 can be arranged to have another matrix pattern. At least one of the first and second vehicular cameras 20a1 and 20a2 serves as, for example, an imaging unit.

The red filter is sensitive to red light within a red-wavelength band, and the green filter is sensitive to green light within a green-wavelength band, and the blue filter is sensitive to blue light within a blue-wavelength band.

The photodiodes of the CMOS image sensor 22 are arranged in both vertical and horizontal directions corresponding to the respective height direction and width direction of the vehicle V. The photodiodes of the CMOS image sensor 22 constitute a light receiving surface.

Specifically, each of the first and second vehicular cameras 20a1 and 20a2 is configured such that the lens system 21 focuses light incident from the forward direction of the vehicle V on the light receiving surface of the CMOS image sensor 22 as an image, i.e., a view image, of a predetermined field of view in front of the vehicle V.

That is, the first and second vehicular cameras 20a1 and 20a2 according to the exemplary embodiment, which are aligned in the width direction of the vehicle V with a predetermined interval therebetween, constitute a stereo camera system configured such that the first and second vehicular cameras 20a1 and 20a2 capture an image of the same field of view in front of the vehicle V. The stereo camera system enables measurement of a distance of an object from the vehicle V based on view images of the object captured by the respective first and second vehicular cameras 20a1 and 20a2.

Each of the first and second vehicular cameras 20a1 and 20a2 is configured to cyclically capture an image of the field of view at predetermined intervals. For example, each of the first and second vehicular cameras 20a1 and 20a2 is configured to capture 60 images, i.e., 60 frame images, per second. Then, each of the first and second vehicular cameras 20a1 and 20a2 is configured to successively output, to the image processing apparatus 10, the view images captured thereby. Note that each of the first and second vehicular cameras 20a1 and 20a2 can be mounted to any portion of the vehicle V, and each of the first and second vehicular cameras 20a1 and 20a2 can have any image capturing cycle.

Figure 2:
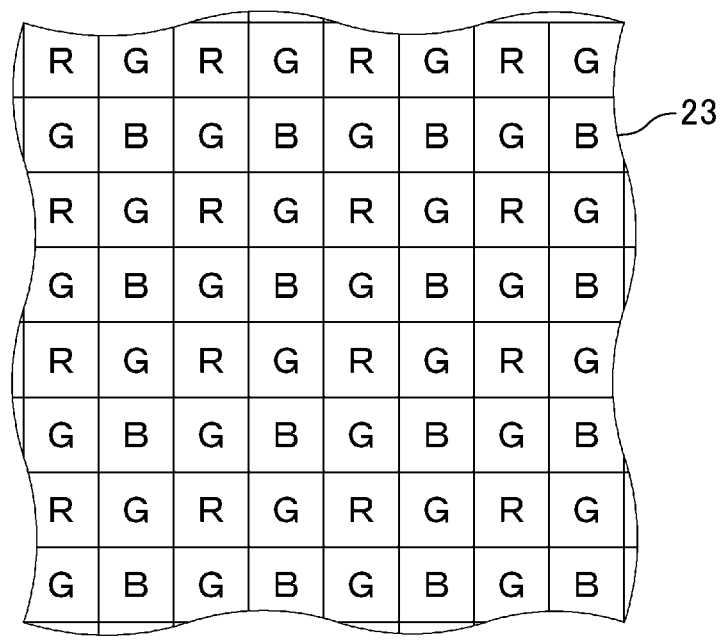
FIG. 2 is a view schematically illustrating an arrangement of red (R), green (G), and blue (B) filters of a color filter unit illustrated in FIG. 1, and an arrangement of red pixels (R), green pixels (G), and blue pixels (B) of a view image captured by an image sensor illustrated in FIG. 1.

As described above, because the red (R), green (G), and blue (B) filters of the color filter unit 23 are arranged to have the Bayer matrix pattern and overlay the respective photodiodes of the CMOS image sensor 22, the photodiodes of the CMOS image sensor with the respective red (R), green (G), and blue (B) filters are schematically illustrated in FIG. 2. The photodiodes of the CMOS image sensor 22 overlayed by the respective red, green, and blue filters will be referred to as red-, green-, and blue-filtered photodiodes (color-filtered photodiodes).

That is, in FIG. 2, each square cell on which R, G, or B is labelled shows a corresponding red-, green-, or blue-filtered photodiode of the CMOS image sensor 22.

That is, a view image, which is captured by each of the first and second vehicular cameras 20a1 and 20a2 based on light incident on the light receiving surface of the CMOS image sensor 22 through the color filter unit 23, is comprised of pixels respectively corresponding to the respective color-filtered photodiodes.

Specifically, an analog view image captured by the imaging unit is comprised of
  (i) Red pixels, each of which has a corresponding red luminance value based on red light sensed by the corresponding red-filtered photodiode
  (ii) Green pixels, each of which has a corresponding green luminance value based on green light sensed by the corresponding green-filtered photodiode
  (iii) Blue pixels, each of which has a corresponding blue luminance value based on blue light sensed by the corresponding blue-filtered photodiode Note that each of the color-filtered photodiodes of the CMOS image sensor 22 will also be referred to as pixel elements of the CMOS image sensor 22, i.e., color-filtered pixel elements.

That is, FIG. 2 also illustrates, in addition to the Bayer arrangement of the color-filtered photodiodes of the CMOS image sensor 22, a view image, captured by the CMOS image sensor 22, comprised of red pixels (R), green pixels (G), and blue pixels (B).

Each of the red pixels of an analog view image captured by the CMOS image sensor 22 has a corresponding one of the red, green, and blue luminance values, i.e., light-intensity values, and each of the red, green, and blue luminance values has one of 256 luminance levels ranging from 0 level to 255 level.

That is, an analog view image captured by each of the first and second vehicular cameras 20a1 and 20a2 is comprised of red pixels (red luminance values), green pixels (green luminance values), and blue pixels (blue luminance values).

For example, each of the first and second vehicular cameras 20a1 and 20a2 can be configured to respectively convert the RGB pixels, i.e., RGB luminance values, of the analog view image into digital RGB pixels, i.e., digital RGB luminance values, in accordance with a predetermined bit width, i.e., the number of bits, thus obtaining a digital view image, i.e., digital image data, comprised of the digital RGB pixels, i.e., digital RGB luminance values. Then, each of the first and second vehicular cameras 20a1 and 20a2 can be configured to output, to the image processing apparatus 10, the digital view image.

As another example, each of the first and second vehicular cameras 20a1 and 20a2 can be configured to output, to the image processing apparatus 10, the captured analog view image based on the RGB pixels, i.e., RGB luminance values, to the image processing apparatus 10. Then, the image processing apparatus 10 can be configured to respectively convert the RGB pixels, i.e., RGB luminance values, of the analog view image into digital RGB pixels, i.e., digital RGB luminance values, in accordance with a predetermined bit width, i.e., the number of bits, thus obtaining a digital view image comprised of the digital RGB pixels, i.e., digital RGB luminance values.

That is, each of the pixel elements, i.e., color-filtered pixel elements, of the CMOS image sensor 22 corresponds to a respective one of the digital RGB pixels of a digital view image captured by each of the first and second vehicular cameras 20a1 and 20a2.

The illumination level sensor 30 is comprised of, for example, a photodiode and a transistor, and is configured to measure the illumination level around the vehicle V and output, to the image processing apparatus 10, an illumination measurement signal indicative of the measured illumination level around the vehicle V.

The image display device 40 is located at a position in the compartment of the vehicle V; the position can be arranged within a viewable range of a driver of the vehicle V, such as a position located adjacently to the front windshield of the vehicle V. The image display device 40 can be configured to display various information items, such as corrected images, outputted from the image processing apparatus 10.

The cruise assist apparatus 50 is configured as an electronic control unit (ECU) comprised of, for example, at least one microcomputer essentially including a central processing unit (CPU) and a storage unit including one or more non-transitory processor-readable media, such as a read-only memory (ROM), a random-access memory (RAM), a flash memory, and/or a hard-disk drive (HDD).

The cruise assist apparatus 50 is configured to receive the corrected images outputted from the image processing apparatus 10, and perform, based on the corrected images, a cruise assist task including, for example,
  1. A first control task of controlling braking of the vehicle V
  2. A second control task of controlling the steering of the vehicle V
  3. A third task of controlling lane keeping of the vehicle V, which keeps the vehicle V within a target lane of a road on which the vehicle V is traveling
  4. A fourth task of controlling outputting of warnings if it is determined that the vehicle V is about to depart from the target lane The image processing apparatus 10 is comprised of at least one microcomputer essentially including a CPU 11 and a storage unit 12 including one or more non-transitory processor-readable media, such as a ROM, a RAM, a flash memory, and/or an HDD.

The storage unit 12 stores one or more programs, i.e., program instructions of one or more programs.

The CPU 11 functionally includes, for example, an image obtainer 101, an illumination-level determiner 102, an image corrector 103, a determiner 104, and an output unit 105.

Figure 3:
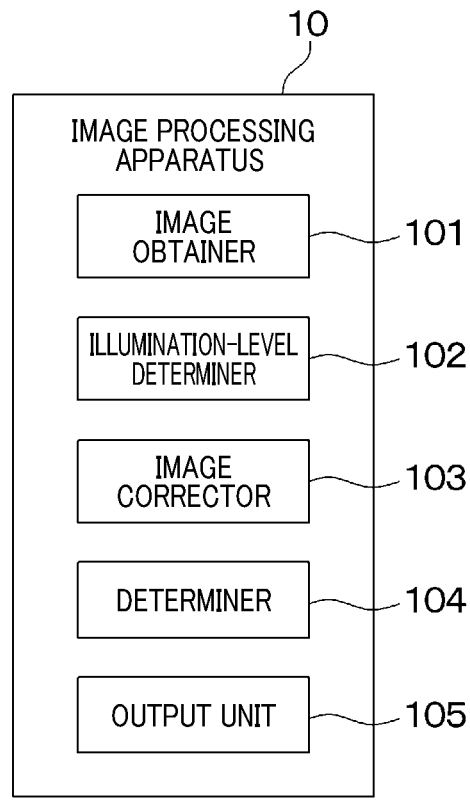
FIG. 3 is a block diagram schematically illustrating an example of the functional structure of the image processing apparatus illustrated in FIG. 1.

For example, the above components 101 to 105 respectively show functions included in the image processing apparatus 10, and therefore these components 101 to are illustrated as individual blocks 101 to 105 in FIG. 3. At least part of all functions, which include the functions 101 to 105, provided by the image processing apparatus 10 can be implemented by at least one processor, such as the CPU 11; the at least one processor can be comprised of (1) The combination of at least one programmable processing unit, i.e., at least one programmable logic circuit, and at least one memory
(2) At least one hardwired logic circuit
(3) At least one hardwired-logic and programmable-logic hybrid circuit The CPU 11 is configured to run the one or more programs, i.e., instructions of the one or more programs stored in the storage unit 11, thus implementing various functions corresponding to the one or more programs.

The image obtainer 101 is configured to obtain a digital view image comprised of digital RGB pixels, i.e., digital RGB luminance values, based on an analog view image captured by each of the first and second vehicular cameras 20a1 and 20a2.

The illumination-level determiner 102 is configured to obtain the illumination measurement signal indicative of the measured illumination level around the vehicle V outputted from the illumination level sensor 30. Then, the illumination-level determiner is configured to compare the measured illumination level around the vehicle V with a predetermined threshold illumination level to thereby determine whether the measured illumination level around the vehicle V is lower than or equal to the predetermined threshold illumination level. The threshold illumination level can be previously determined to enable the illumination-level determiner 102 to determine whether a present light condition, i.e., a present brightness condition, around the vehicle V, i.e., around the cameras 20a1 and 20a2, is a dark condition, i.e., a low light condition. In other words, the threshold illumination level can be previously determined to enable the illumination-level determiner 102 to determine whether the digital view image obtained by the image obtainer 101 is captured during a night-time period or other time periods, such as a daytime period.

The image corrector 103 is configured to perform a corrected-image generation routine of generating a corrected image based on the digital view image for each of the first and second vehicular camera 20a1 and 20a2 obtained by the image obtainer 101.

Specifically, the corrected-image generation routine is configured to determine whether there is at least one point light source in the field of view if the illumination-level determiner determines that the digital view image obtained by the image obtainer 101 is captured during the night-time period. The point light-source determination task will be described in detail later.

The corrected-image generation routine is also configured to perform, if the point light-source determination task determines that there is at least one point light source in the field of view, a modified corrected-image generation task.

The modified corrected-image generation task includes a first step of determining at least one point light-source pixel region included in the digital view image; the determined at least one light-source pixel region corresponds to the location of the at least one point light source in the digital view image.

The modified corrected-image generation task includes a second step of referring to previously prepared ascertainment data items stored in, for example, the storage unit 11, to thereby perform a luminance-value ratio ascertainment task of ascertaining, for each color, a luminance-value ratio for each pixel in the at least one point light-source pixel region included in the digital view image. The luminance-value ratio ascertainment task will be described in detail later.

The modified corrected-image generation task includes a third step of generating, based on the luminance-value ratio for each pixel in the at least one point light-source pixel region for each color, a local corrected image of the at least one point light-source pixel region.

The modified corrected-image generation task includes a fourth step of performing a regular generation task of generating, based on the digital RGB pixels of the digital view image obtained by the image obtainer 101, a remaining corrected image of the remaining region, except for the point light-source pixel region, included in the digital view image.

The modified corrected-image generation task includes a fifth step of combining the local corrected image with the remaining corrected image to accordingly generate a modified corrected image.

In contrast, the corrected-image generation routine is configured to perform, otherwise if the illumination-level determiner determines that the digital view image obtained by the image obtainer 101 is captured during the other time periods or otherwise if it is determined that there are no point light sources in the field of view, the regular generation task of generating, based on the digital RGB pixels of the digital view image obtained by the image obtainer 101, a regular corrected image.

That is, corrected images generated by the image corrector 103 include regular corrected images and modified corrected images described set forth above.

Note that the technical term "point light source" according to the exemplary embodiment is defined as a light source, light outputted from which enters specific one or particular pixel elements (photodiodes), for example, one pixel element, two pixel elements, or three pixel elements, in the light receiving surface of the CMOS image sensor 22. Distant taillamps or distant reflectors located from the vehicle V are examples of the point light sources.

Next, the following describes how the image corrector 103 performs the regular generation task.

Specifically, the image corrector 103 performs, as the regular generation task, the steps of (I) Ascertaining, as a red luminance value for each red pixel of the digital view image, a luminance value sensed by the corresponding red-filtered photodiode
(II) Ascertaining, as a green luminance value for each red pixel of the digital view image, an average value of green luminance values of the green pixels located adjacently around the corresponding red pixel
(III) Ascertaining, as a blue luminance value for each red pixel of the digital view image, an average value of blue luminance values of the blue pixels located adjacently around the corresponding red pixel
(IV) Ascertaining, as a green luminance value for each green pixel of the digital view image, a luminance value sensed by the corresponding green-filtered photodiode
(V) Ascertaining, as a red luminance value for each green pixel of the digital view image, an average value of red luminance values of the red pixels located adjacently around the corresponding green pixel
(VI) Ascertaining, as a blue luminance value for each green pixel of the digital view image, an average value of blue luminance values of the blue pixels located adjacently around the corresponding green pixel (VII) Ascertaining, as a blue luminance value for each blue pixel of the digital view image, a luminance value sensed by the corresponding blue-filtered photodiode (VIII) Ascertaining, as a red luminance value for each blue pixel of the digital view image, an average value of red luminance values of the red pixels located adjacently around the corresponding blue pixel (IX) Ascertaining, as a green luminance value for each blue pixel of the digital view image, an average value of green luminance values of the green pixels located adjacently around the corresponding blue pixel Then, the image corrector 103 performs, as the regular generation task, a task of ascertaining a luminance-value ratio of the digital view image obtained by the image obtainer 101 to accordingly generate one of 1. The corrected image in accordance with the ascertained luminance-value ratio and the digital RGB pixels of the digital view image
2. The remaining corrected image of the remaining region included in the digital view image in accordance with the ascertained luminance-value ratio and the digital RGB pixels of the remaining region included in the digital view image Next, the following describes how the image corrector 103 performs the point light-source determination task.

Specifically, the image corrector 103 performs, as the point light-source determination task, a scanning step of horizontally scanning all the RGB pixels of the digital view image from the left upper pixel to the right lower pixel to thereby ascertain the luminance values of all the RGB pixels of the digital view image. Then, the image corrector 103 performs, as the point light-source determination task, a calculation step of calculating a luminance average in the luminance values of all the RGB pixels of the digital view image.

Next, the image corrector 103 performs, as the point light-source determination task, a first determining step of determining whether there is at least one pixel-block of one or more pixels in all the RGB pixels; the luminance values of the one or more pixels of the at least one pixel-block are higher by at least a predetermined threshold value than the average luminance.

Upon determination that there is at least one pixel-block of one or more pixels in all the RGB pixels whose luminance values are higher by at least the predetermined threshold value than the average luminance, the image corrector 103 performs, as the point light-source determination task, a second determination task of determining whether the size of the at least one pixel-block is smaller than or equal to predetermined several pixels, for example, three pixels.

Upon determination that the size of the at least one pixel-block is smaller than or equal to the predetermined several pixels, for example, three pixels, the image corrector 103 performs, as the point light-source determination task, a task of determining that there is at least one point light source in a portion of the field of view; the portion corresponds to the at least one pixel-block included in the digital view image.

Otherwise, upon determination that (I) there are no pixel-blocks of one or more pixels in all the RGB pixels whose luminance values are higher by the at least the predetermined threshold value than the average luminance or (II) the size of the at least one pixel-block is larger than the several pixels, for example, three pixels, the image corrector 103 performs, as the point light-source determination task, a task of determining that there are no point light sources in the digital view image, thus determining that light enters the whole of the color-filtered photodiodes of the MOS image sensor 22.

An example method of the point light-source determination task has been described set forth above, but the point light-source determination task is not limited to the above example method.

As another example method of the point light-source determination task, the image corrector 103 can determine (I) Whether at least one pixel-block of one or several pixels in all the RGB pixels of the digital view image, whose luminance values of the one or several pixels of the at least one pixel-block are higher than pixel values of peripheral pixels around the at least one pixel-block (II) That there is at least one point light source in a portion of the field of view, which corresponds to the at least one pixel-block, upon determination that the at least one pixel-block of the one or several pixels in all the RGB pixels of the digital view image, whose luminance values of the one or several pixels of the at least one pixel-block are higher than the pixel values of the peripheral pixels around the at least one pixel-block As a further example method of the point light-source determination task, the image corrector 103 can perform the scanning step and calculation step to accordingly calculate the luminance average in the scanned luminance values of all the RGB pixels of the digital view image. Then, the image corrector 103 can calculate, as a standard deviation, how far from the luminance average is each of the scanned luminance values of all the RGB pixels of the digital view image to accordingly determine whether there is at least one point light source in the field of view based on calculated information indicative of how from the luminance average is each of the scanned luminance values of all the RGB pixels of the digital view image.

Upon determination that there is at least one point light source in a portion of the field of view, which corresponds to the at least one pixel-block included in the digital view image, the image corrector 103 defines, as at least one point light-source pixel region, at least one predetermined pixel region enclosing the at least one pixel-block in the digital view image. For example, the image corrector 103 defines, as at least one point light-source pixel region in the digital view image, at least one pixel-matrix region, which is centered around the at least one pixel-block, and comprised of pixels in the horizontal direction and 5 pixels in the vertical direction, referred to as a (5×5) array of pixels.

Next, the following describes how the image corrector 103 performs the luminance-value ratio ascertainment task in accordance with the previously prepared ascertainment data items stored in the storage unit 11.

Specifically, as the previously prepared ascertainment data items, previously prepared red ascertainment data item, previously prepared green ascertainment data item, and previously prepared blue ascertainment data item are stored in the storage unit 11.

Additionally, as the luminance-value ratio ascertainment task, the image corrector 103 performs (I) A red luminance-value ratio ascertainment task based on the red ascertainment data item assuming that all pixels of the at least one point light-source pixel region are red pixels (II) A green luminance-value ratio ascertainment task based on the green ascertainment data item assuming that all pixels of the at least one point light-source pixel region are green pixels (III) A blue luminance-value ratio ascertainment task based on the blue ascertainment data item assuming that all pixels of the at least one point light-source pixel region are blue pixels More specifically, the image corrector 103 estimates, for each pixel of the point light-source pixel region, the red luminance-value ratio, the green luminance-value ratio, and the blue luminance-value ratio without influence from the color-sensitivity difference caused by the color filter unit 23. For example, the color-sensitivity difference for a red pixel represents how much the red luminance value of the red pixel is higher than the other-color luminance values of the red pixel.

Next, the following describes, for example, how the image corrector 103 performs the green luminance-value ratio ascertainment task based on the green ascertainment data item.

The following describes what the green ascertainment data item means.

Figure 4:
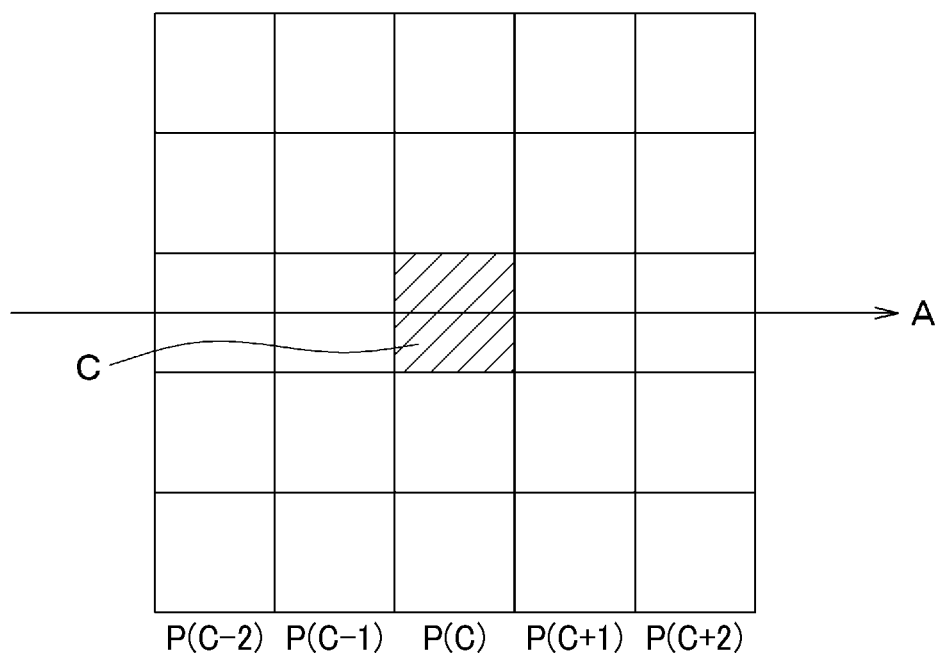
FIG. 4 is a view schematically illustrating color-filtered pixel elements of the image sensor corresponding to the respective RGB pixels of a captured digital view image assuming that light ideally enters, through a lens system, only a center pixel element of the pixel elements of the image sensor, and therefore the light is ideally received only by a center pixel element of the pixel elements of the image sensor.

FIG. 4 schematically illustrates the color-filtered pixel elements of the CMOS image sensor 22 corresponding to the respective RGB pixels of a captured digital view image assuming that (1) All the filters of the color filter unit 23 are green filters
(2) Light ideally enters, through the lens system 21, only a center pixel element of the pixel elements of the CMOS image sensor 22, which is hatched and labeled by C, and therefore the light is ideally received only by the center pixel element C of the pixel elements of the CMOS image sensor 22.

In this case, blurring and/or lack of focus of the lens system 21 may however cause luminance values of pixels . . . P(C−2), P(C−1), P(C), P(C+1), P(C+2) . . . , which are centered on the center pixel P(C), aligned on the horizontal line A in FIG. 4 to have a green luminance-value ratio distribution illustrated in FIG. 5. That is, the green luminance-value ratio distribution illustrated in FIG. 5 has a maximum green luminance value (peak green luminance value) of the center pixel P(C), and exponentially decreases from the peak luminance value with distance of the other pixels P(C−2), P(C−1), P(C+1), P(C+2) from the center pixel P(C) in accordance with a normal distribution.

Note that a green luminance-value ratio of any pixel in a digital view image represents the ratio of the green luminance value of the pixel to the maximum green luminance value (peak green luminance value) in the digital view image.

Figure 5:
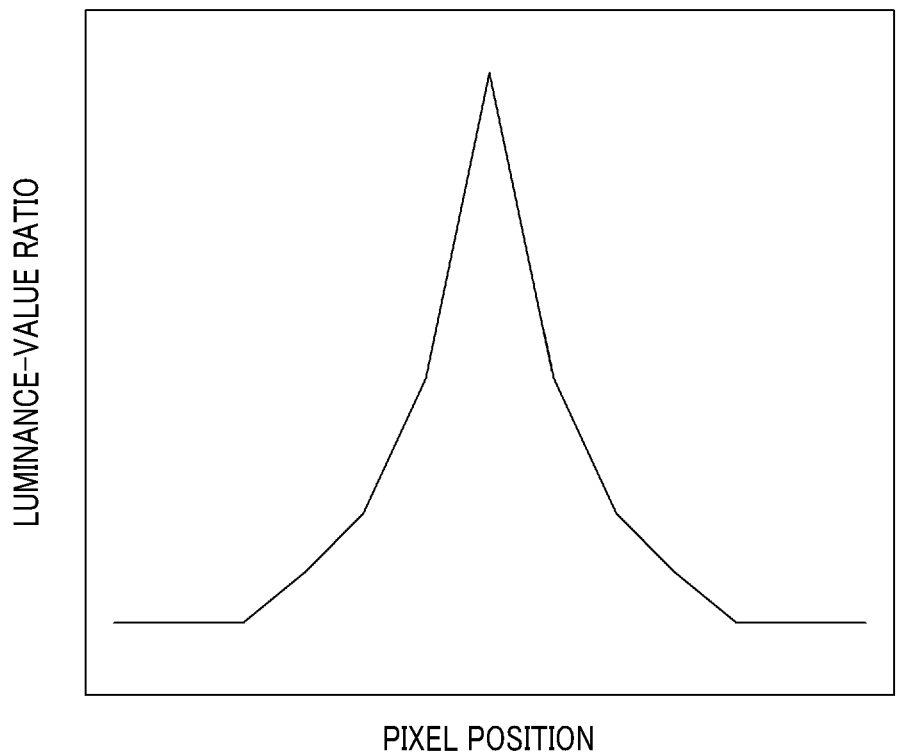
FIG. 5 is a graph schematically illustrating an example of a green luminance-value ratio distribution with respect to positions of pixels aligned in line A in FIG. 4.

In particular, FIG. 5 illustrates that the green luminance-value ratio of each of the pixels . . . P(C−3), P(C−2), P(C−1), P(C), P(C+1), P(C+2), P(C+3) . . . aligned on the horizontal line A with respect to the peak green luminance value when the green luminance values of the respective pixels aligned on the horizontal line A are normalized by the peak green luminance value so that the peak green luminance value is represented by 1.

Additionally, the green luminance-value ratio of any pixel in the digital view image is represented by the following relational expression [eq1]:

$$f(x, y) = \frac{1}{\sqrt{2\pi\sigma^2}} \exp\left(-\frac{x^2 + y^2}{2\sigma^2}\right) \quad [\text{eq1}]$$

where:

x represents a first relative coordinate of any pixel in the digital view image in the horizontal direction relative to the center pixel C;

y represents a second relative coordinate of any pixel in the digital view image in the vertical direction relative to the center pixel C;

(x, y) represents the position of any pixel, which has the first and second coordinates, in the digital view image relative to the center pixel C;

f (x, y) represents the green luminance-value ratio of any pixel at the position (x, y) in the digital view image with respect to the peak green luminance value of the center pixel C; and σ represents a parameter determined based on the dependency of the corresponding vehicular camera 20a1, 20a2 on the lens system 21.

The dependency of each vehicular camera 20a1, 20a2 on the corresponding lens system 21 can define the resolution of the vehicular camera 20a1, 20a2.

Specifically, the green luminance-value ratio distribution illustrated in FIG. 5 demonstrates that, if one particular pixel, such a center pixel, in the digital view image has a maximum green luminance value, i.e., a peak luminance value, green luminance values of the other pixels, located around the particular pixel, in the digital view image exponentially decrease from the peak luminance value with distance of the other pixels from the particular pixel in accordance with a normal distribution.

Similarly, the relational expression [eq1] for the green luminance-value ratio of any pixel in the digital view image demonstrates that, if one particular pixel, such a center pixel, in a predetermined-sized pixel region of the digital view image has a maximum green luminance value, i.e., a peak luminance value, the green luminance values of the other pixels, located around the particular pixel, in the digital view image exponentially decrease from the peak luminance value with distance of the other pixels from the particular pixel in accordance with a normal distribution.

Like the green ascertainment data item, a red luminance-value ratio distribution, which is similar to the green luminance-value ratio distribution illustrated in FIG. 5, demonstrates that, if one particular pixel, such a center pixel, in a predetermined-sized pixel region of the digital view image has a maximum red luminance value, i.e., a peak luminance value, red luminance values of the other pixels, located around the particular pixel, in the digital view image exponentially decrease from the peak luminance value with distance of the other pixels from the particular pixel in accordance with a normal distribution.

Similarly, the relational expression [eq1] for the red luminance-value ratio of any pixel in the digital view image demonstrates that, if one particular pixel, such a center pixel, in a predetermined-sized pixel region of the digital view image has a maximum red luminance value, i.e., a peak luminance value, the red luminance values of the other pixels, located around the particular pixel, in the digital view image exponentially decrease from the peak luminance value with distance of the other pixels from the particular pixel in accordance with a normal distribution.

Additionally, like the green ascertainment data item, a blue luminance-value ratio distribution, which is similar to the green luminance-value ratio distribution illustrated in FIG. 5, demonstrates that, if one particular pixel, such a center pixel, in the digital view image has a maximum blue luminance value, i.e., a peak luminance value, blue luminance values of the other pixels, located around the particular pixel, in the digital view image exponentially decrease from the peak luminance value with distance of the other pixels from the particular pixel in accordance with a normal distribution.

Similarly, the relational expression [eq1] for the blue luminance-value ratio of any pixel in the digital view image demonstrates that, if one particular pixel, such a center pixel, in a predetermined-sized pixel region of the digital view image has a maximum blue luminance value, i.e., a peak luminance value, the blue luminance values of the other pixels, located around the particular pixel, in the digital view image exponentially decrease from the peak luminance value with distance of the other pixels from the particular pixel in accordance with a normal distribution.

Information or data indicative of the red luminance-value ratio distribution illustrated in FIG. 5 and/or the relational expression [eq1] for the red luminance-value ratio of any pixel in the digital view image are stored beforehand in the storage unit 12 as the red ascertainment data item. Similarly, information or data indicative of the green luminance-value ratio distribution illustrated in FIG. 5 and/or the relational expression [eq1] for the green luminance-value ratio of any pixel in the digital view image are stored beforehand in the storage unit 12 as the green ascertainment data item. Additionally, information or data indicative of the blue luminance-value ratio distribution illustrated in FIG. 5 and/or the relational expression [eq1] for the blue luminance-value ratio of any pixel in the digital view image are stored beforehand in the storage unit 12 as the blue ascertainment data item.

Alternatively, as, for example, a digital view image was captured by each of the first and second vehicular cameras 20a1 and 20a2 whose color filter unit 23 is comprised of only green filters while light enters only the center pixel of the CMOS image sensor 22 via the corresponding center green filter. Then, green-luminance-value ratios for the respective pixels of the digital view image are measured, and the green luminance-value distribution as the green ascertainment data item. The same goes for each of the red ascertainment data item and the blue ascertainment data item.

The image corrector 103 performs, as the green luminance-value ratio ascertainment task, a first step of scanning all the pixels of the at least one point light-source pixel region to accordingly measure the luminance values of all the pixels of the at least one point light-source pixel region.

Then, the image corrector 103 performs, as the green luminance-value ratio ascertainment task, a second step of ascertaining, based on the measured luminance values of the corresponding green pixels of the at least one point light-source pixel region and the green ascertainment data item, a green luminance-value ratio for each pixel of the at least one point light-source pixel region.

The following describes in detail the first and second steps of the green luminance-value ratio ascertainment task assuming that the at least one point light-source pixel region is a linear pixel region of eleven red and green pixels P1 to P11 alternately arranged in the horizontal direction.

Figure 6:
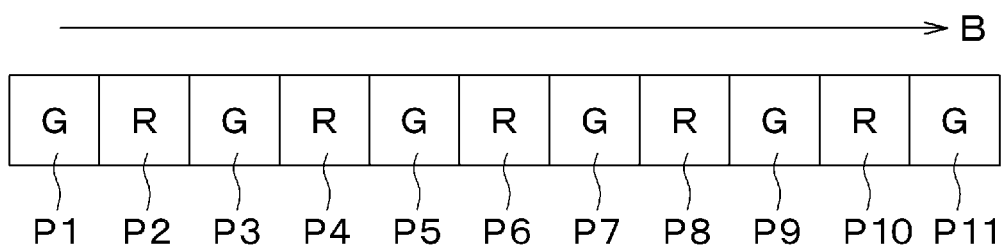
FIG. 6 is a view schematically illustrating an arrangement of red and green pixels alternately arranged in a horizontal direction (see arrow B)

Specifically, as illustrated in FIG. 6, reference character P1 is assigned to the leftmost pixel, i.e., the first pixel, in the linear pixel region, reference character P2 is assigned to the second pixel located adjacently on the right side of the first pixel P1, and reference characters P3 to P11 are successively assigned to the remaining third to eleventh pixels from left to right. The pixels P1, P3, P5, P7, P9, and P11 are green pixels (see "G" in FIG. 6), and the pixels P2, P4, P6, P8, and P10 are red pixels (see "R" in FIG. 6).

The first step of the green luminance-value ratio ascertainment task successively scans the pixels P1 to P11 of the linear pixel region in the horizontal direction (see arrow B) to accordingly measure the green luminance values of the respective green pixels P1, P3, P5, P7, P9, and P11.

Next, the first step of the green luminance-value ratio ascertainment task extracts the highest one of the measured green luminance values of the green pixels P1, P3, P5, P7, P9, and P11, and normalizes, by the extracted highest luminance-value, the measured green luminance values of the green pixels P1, P3, P5, P7, P9, and P11, so that the ratio of the highest luminance-value is represented by 1. That is, each of the measured green luminance values of the green pixels P1, P3, P5, P7, P9, and P11 is expressed as a luminance-value ratio of the corresponding one of the measured green luminance values of the green pixels P1, P3, P5, P7, P9, and P11 to the extracted highest luminance-value.

Next, the following describes the second step of the green luminance-value ratio ascertainment task using the green luminance-value ratio distribution illustrated in FIG. 5 stored in the storage unit 12 as the green ascertainment data item.

Figure 7A:
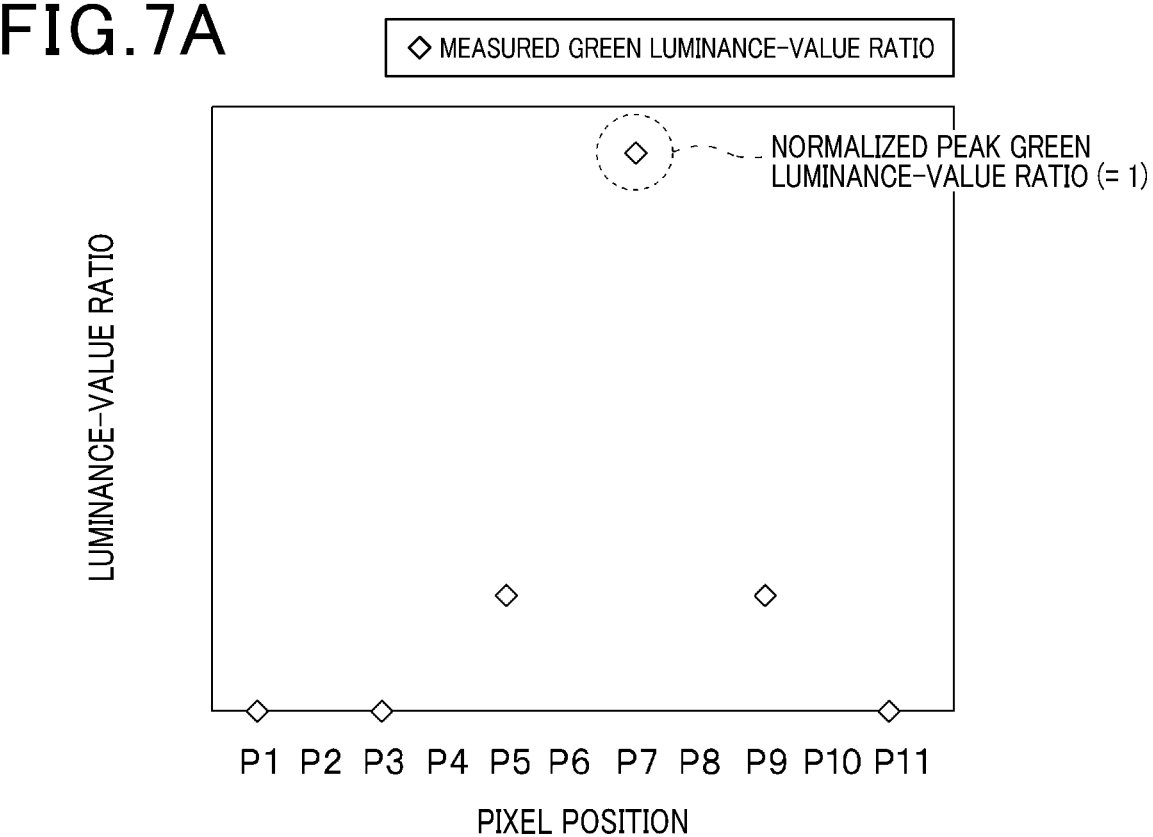
FIG. 7A is a graph schematically illustrating a first example distribution of measured green luminance-value ratios of green pixels illustrated in FIG. 6 such that a highest luminance-value ratio of the green pixel (P7) is only prominent with respect to the measured green luminance-value ratios of other green pixels (P1, P3, P5, P9, and P11)

FIG. 7A illustrates a first example distribution of the measured green luminance value ratios of the green pixels P1, P3, P5, P7, P9, and P11 such that the highest luminance-value ratio of the green pixel P7 is only prominent with respect to the measured green luminance value ratios of the other green pixels P1, P3, P5, P9, and P11.

For the first example distribution, the second step of the green luminance-value ratio ascertainment task refers to the green luminance-value ratio distribution illustrated in FIG. 5 stored in the storage unit 12 as the green ascertainment data item to accordingly plot (1) The highest luminance-value ratio of the green pixel P7 on the peak of the green luminance-value ratio distribution illustrated in FIG. 5, so that the green pixel P7 matches the center pixel P(C)

(2) The green luminance value ratios of the green pixels P1, P3, P5, P9, and P11 on the corresponding portions of the green luminance-value ratio distribution at the respective green pixels P(C−6), P(C−4), P(C−2), P(C+2), and P(C+4) illustrated in FIG. 5

If at least one of the measured green luminance value ratios of the green pixels P1, P3, P5, P9, and P11 is not plotted on the corresponding portion of the green luminance-value ratio distribution illustrated in FIG. 5, the at least one of the measured green luminance value ratios of the green pixels P1, P3, P5, P9, and P11 can be corrected to be plotted on the corresponding portion of the green luminance-value ratio distribution illustrated in FIG. 5, or the corresponding portion of the green luminance-value ratio distribution illustrated in FIG. 5 can be corrected so that the at least one of the measured green luminance value ratios of the green pixels P1, P3, P5, P9, and P11 is plotted thereon.

Figure 7B:
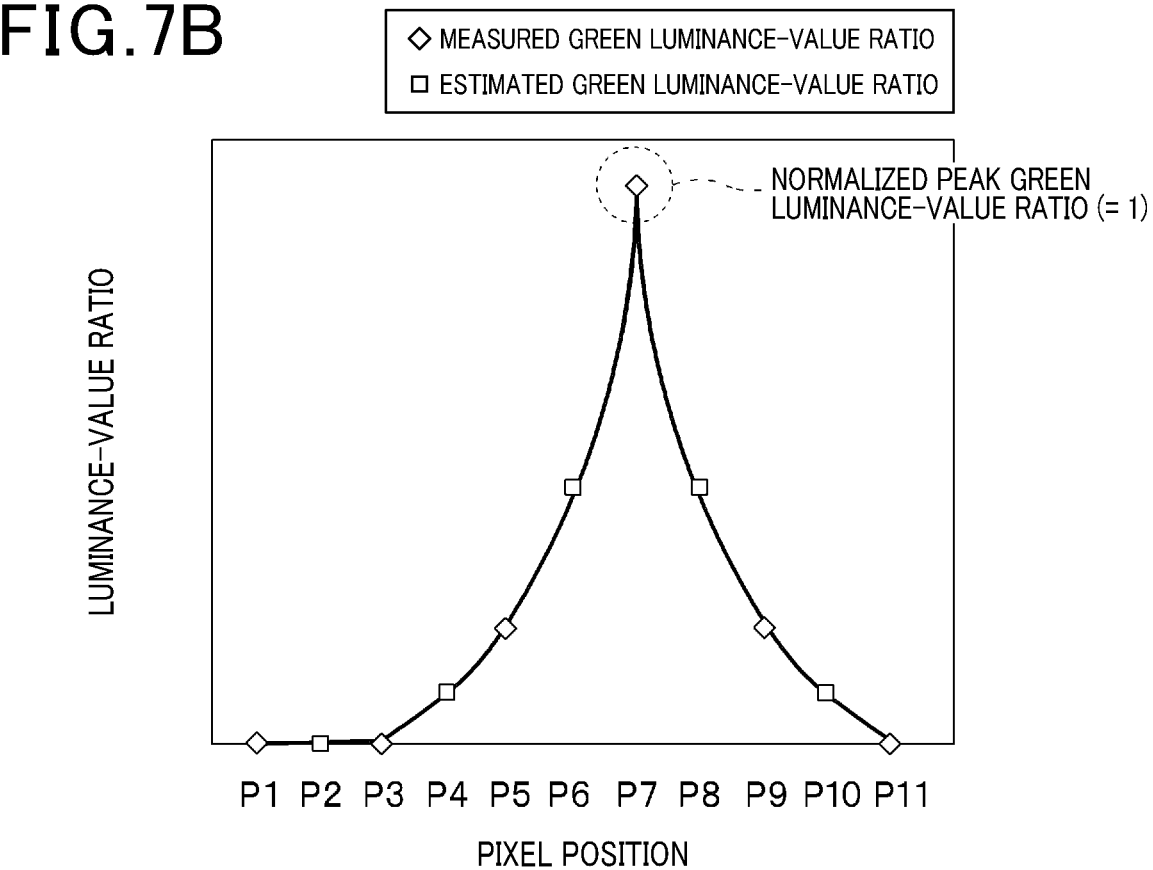
FIG. 7B is a graph schematically illustrating a distribution of the measured and estimated green luminance-value ratios of all the pixels (P1 to P11) based on the distribution of the green luminance-value ratios illustrated in FIG. 7A.

Then, the second step of the green luminance-value ratio ascertainment task estimates, based on the green luminance-value ratio distribution, green luminance-value ratios of the respective pixels P2, P4, P6, P8, and P10 on the green luminance-value ratio distribution at the respective green pixels P(C−5), P(C−3), P(C−1), P(C+1), and P(C+3) (see FIG. 7B), thus determining (i) that a point light source is located in the pixel P7 of the linear pixel region as the at least one point light-source pixel region, and (ii) the luminance-value ratios of all the pixels P1 to P11 of the linear pixel region as the at least one point light-source pixel region.

Figure 8A:
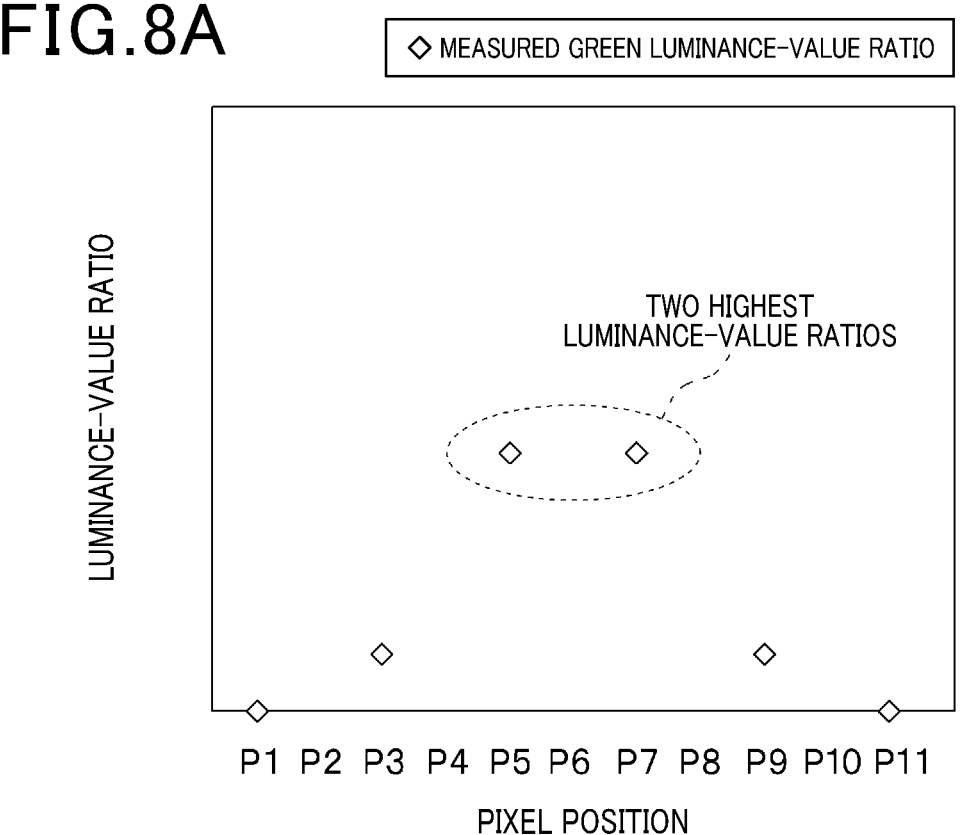
FIG. 8A is a graph schematically illustrating a second example distribution of measured green luminance value ratios of the green pixels illustrated in FIG. 6 such that the same highest luminance-value ratio of each of the two green pixels (P5 and P7) is prominent with respect to the measured green luminance value ratios of the other green pixels (P1, P3, P9, and P11)

FIG. 8A illustrates a second example distribution of the measured green luminance value ratios of the green pixels P1, P3, P5, P7, P9, and P11 such that the same highest luminance-value ratio of each of the two green pixels P5 and P7 is prominent with respect to the measured green luminance value ratios of the other green pixels P1, P3, P9, and P11.

For the second example distribution, the second step of the green luminance-value ratio ascertainment task refers to the green luminance-value ratio distribution illustrated in FIG. 5 stored in the storage unit 12 as the green ascertainment data item to accordingly plot
  (1) The two highest luminance-value ratios of the green pixels P5 and P7 on the peak of the green luminance-value ratio distribution at the respective two green pixels P(C−1) and P(C+1) illustrated in FIG. 5, so that the peak luminance-value ratio of the green luminance-value ratio distribution is set to an estimated green luminance-value ratio at the green pixel P6 matching the center pixel P(C)
  (2) The green luminance values of the green pixels P1, P3, P9, and P11 on the corresponding portions of the green luminance-value ratio distribution at the respective green pixels P(C−5), P(C−3), P(C+3), and P(C+5) illustrated in FIG. 5

If at least one of the measured green luminance value ratios of the green pixels P1, P3, P5, P7, P9, and P11 is not plotted on the corresponding portion of the green luminance-value ratio distribution illustrated in FIG. 5, the at least one of the measured green luminance value ratios of the green pixels P1, P3, P5, P7, P9, and P11 can be corrected to be plotted on the corresponding portion of the green luminance-value ratio distribution illustrated in FIG. 5, or the corresponding portion of the green luminance-value ratio distribution illustrated in FIG. 5 can be corrected so that the at least one of the measured green luminance value ratios of the green pixels P1, P3, P5, P7, P9, and P11 is plotted thereon.

Figure 8B:
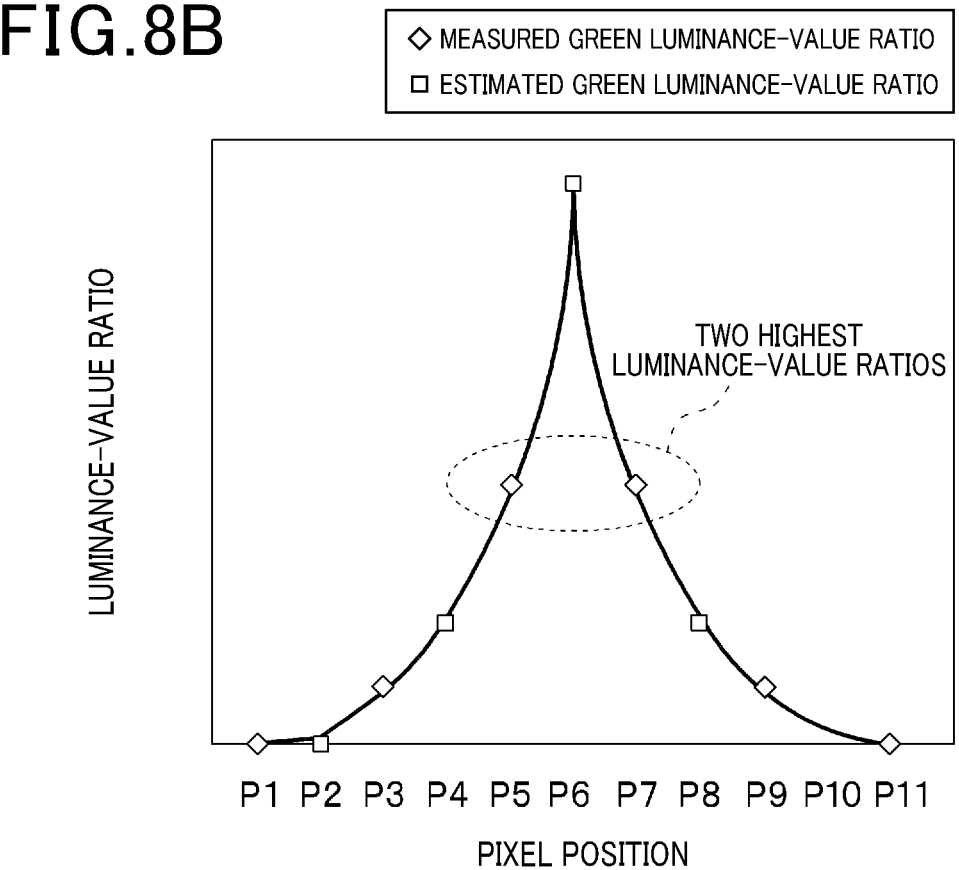
FIG. 8B is a graph schematically illustrating a distribution of the measured and estimated green luminance-value ratios of all the pixels (P1 to P11) based on the distribution of the green luminance-value ratios illustrated in FIG. 8A.

Then, the second step of the green luminance-value ratio ascertainment task estimates, based on the green luminance-value distribution, green luminance-value ratios of the respective pixels P2, P4, P8, and P10 on the green luminance-value ratio distribution at the respective green pixels P(C−4), P(C−2), P(C+2), and P(C+4) (see FIG. 8B), thus determining (i) that a point light source is located in the pixel P6 of the linear pixel region as the at least one point light-source pixel region, and (ii) the luminance-value ratios of all the pixels P1 to P11 of the linear pixel region as the at least one point light-source pixel region.

Figure 9A:
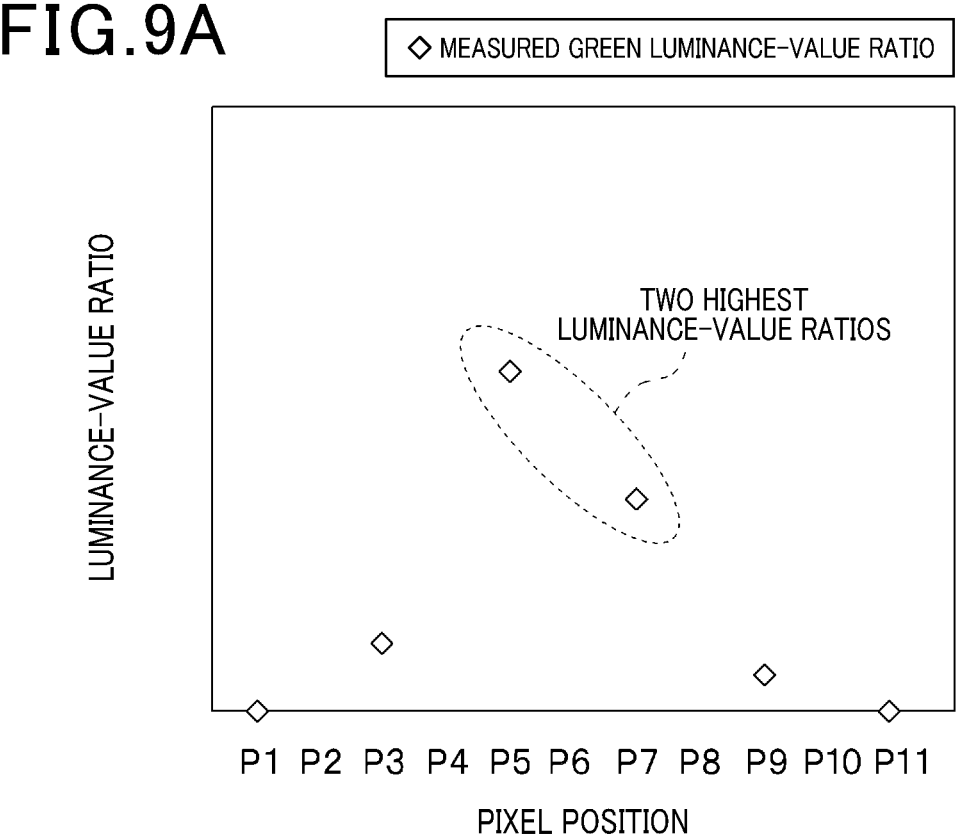
FIG. 9A illustrates a third example distribution of measured green luminance value ratios of the green pixels illustrated in FIG. 6 such that a highest luminance-value ratio of the green pixel (P5) and a second highest luminance-value ratio of the green pixel (P7) are prominent with respect to the measured green luminance value ratios of the other green pixels (P1, P3, P9, and P11)

FIG. 9A illustrates a third example distribution of the measured green luminance value ratios of the green pixels P1, P3, P5, P7, P9, and P11 such that the highest luminance-value ratio of the green pixel P5 and the second highest luminance-value ratio of the green pixel P7 are prominent with respect to the measured green luminance value ratios of the other green pixels P1, P3, P9, and P11.

For the third example distribution, the second step of the green luminance-value ratio ascertainment task refers to the green luminance-value ratio distribution illustrated in FIG. 5 stored in the storage unit 12 as the green ascertainment data item to accordingly plot
  (1) The highest luminance-value ratio of the green pixel P5 on the green luminance-value ratio distribution at the green pixel P(C−1) illustrated in FIG. 5
  (2) The second highest luminance-value ratio of the green pixel P7 on the green luminance-value ratio distribution at the green pixel P(C+1) illustrated in FIG. 5
  (3) The peak luminance-value ratio of the green luminance-value ratio distribution at the center pixel P(C) is located to be closer to the luminance-value ratio of the green pixel P5 than to the luminance-value ratio of the green pixel P7
  (4) The green luminance value ratios of the green pixels P1, P3, P9, and P11 on the corresponding portions of the green luminance-value ratio distribution at the respective green pixels P(C−5), P(C−3), P(C+3), and P(C+5) illustrated in FIG. 5

If at least one of the measured green luminance value ratios of the green pixels P1, P3, P5, P7, P9, and P11 is not plotted on the corresponding portion of the green luminance-value ratio distribution illustrated in FIG. 5, the at least one of the measured green luminance value ratios of the green pixels P1, P3, P5, P7, P9, and P11 can be corrected to be plotted on the corresponding portion of the green luminance-value ratio distribution illustrated in FIG. 5, or the corresponding portion of the green luminance-value ratio distribution illustrated in FIG. 5 can be corrected so that the at least one of the measured green luminance value ratios of the green pixels P1, P3, P5, P7, P9, and P11 is plotted thereon.

Figure 9B:
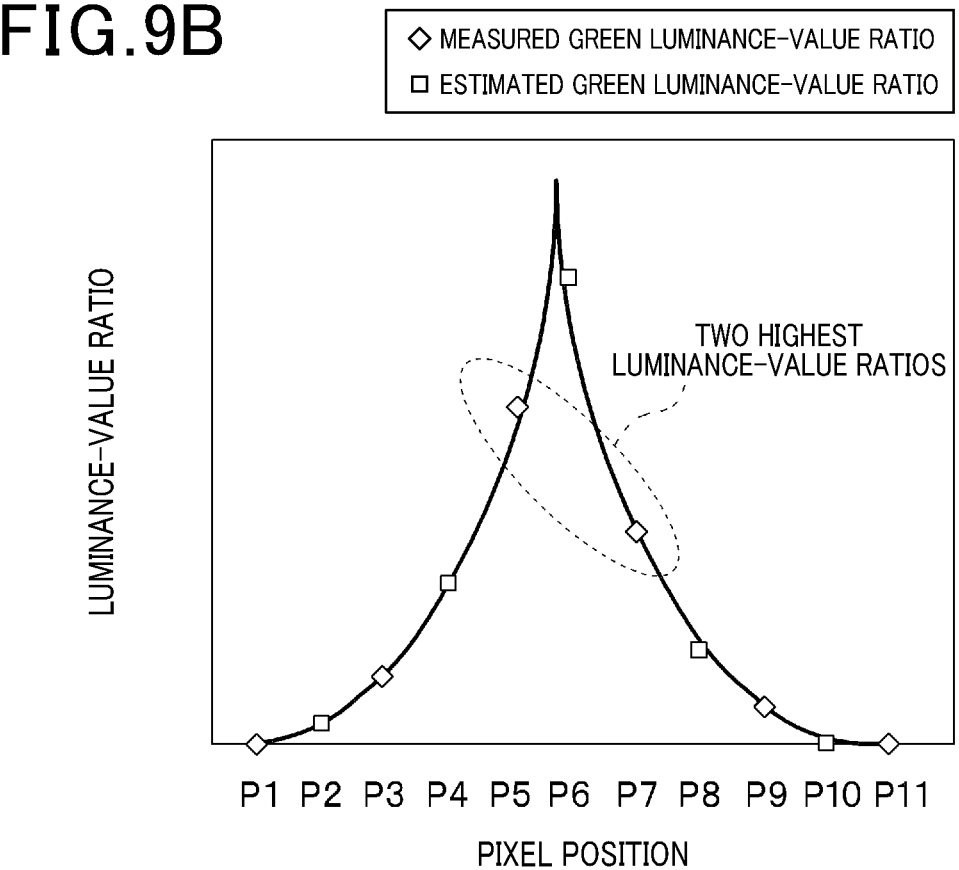
FIG. 9B is a graph schematically illustrating a distribution of the measured and estimated green luminance-value ratios of all the pixels (P1 to P11) based on the distribution of the green luminance-value ratios illustrated in FIG. 9A.

Then, the second step of the green luminance-value ratio ascertainment task estimates, based on the green luminance-value distribution, green luminance-value ratios of the respective pixels P2, P4, P6, P8, and P10 on the green luminance-value ratio distribution at the respective green pixels P(C−4), P(C−2), P(C), P(C+2), and P(C+4) (see FIG. 9B), thus determining (i) that a point light source is located at a position between the green pixels P5 and P6, which is closer to the green pixel P5 than to the green pixel P6, in the linear pixel region as the at least one point light-source pixel region, and (ii) the luminance-value ratios of all the pixels P1 to P11 of the linear pixel region as the at least one point light-source pixel region.

Like the first and second steps of the green luminance-value ratio ascertainment task, the image corrector 103 performs, as the red luminance-value ratio estimation, a first step of scanning all the pixels of the at least one point light-source pixel region to accordingly measure the luminance values of all the pixels of the at least one point light-source pixel region. Then, the image corrector 103 performs, as the red luminance-value ratio ascertainment task, a second step of ascertaining, based on the measured luminance values of all the pixels of the at least one point light-source pixel region and the red ascertainment data item, a red luminance-value ratio for each pixel of the at least one point light-source pixel region.

Similarly, like the first and second steps of the green luminance-value ratio ascertainment task, the image corrector 103 performs, as the blue luminance-value ratio estimation, a first step of scanning all the pixels of the at least one point light-source pixel region to accordingly measure the luminance values of all the pixels of the at least one point light-source pixel region. Then, the image corrector 103 performs, as the blue luminance-value ratio ascertainment task, a second step of ascertaining, based on the measured luminance values of all the pixels of the at least one point light-source pixel region and the blue ascertainment data item, a blue luminance-value ratio for each pixel of the at least one point light-source pixel region.

Although the first and second steps of each of the red, green, blue luminance-value ratio ascertainment tasks have been described assuming that the at least one point light-source pixel region is a linear pixel region of eleven red and green pixels P1 to P11 alternately arranged in the horizontal direction, the at least one point light-source pixel region is actually a two-dimensional region of RGB pixels. Specifically, the first and second steps of each of the red, green, blue luminance-value ratio ascertainment tasks actually scan successively the two-dimensionally arranged pixels of the at least one point light-source pixel region to accordingly ascertain (I) The red luminance-value ratio of each pixel of the at least one point light-source pixel region (II) The green luminance-value ratio of each pixel of the at least one point light-source pixel region (III) The blue luminance-value ratio of each pixel of the at least one point light-source pixel region In particular, the red luminance-value ratio of each pixel of the at least one point light-source pixel region estimates a luminance-value ratio of the corresponding pixel assuming that all the pixels of the at least one point light-source pixel region are red pixels, i.e., red-filtered pixels. Similarly, the green luminance-value ratio of each pixel of the at least one point light-source pixel region estimates a luminance-value ratio of the corresponding pixel assuming that all the pixels of the at least one two-dimensional point light-source pixel region are green pixels, i.e., green-filtered pixels. Additionally, the blue luminance-value ratio of each pixel of the at least one point light-source pixel region estimates a luminance-value ratio of the corresponding pixel assuming that all the pixels of the at least one point light-source pixel region are blue pixels, i.e., blue-filtered pixels.

That is, the red, green, and blue luminance-value ratios of each pixel of the at least one point light-source pixel region are obtained independently of the color-sensitivity difference caused by the color filter unit 23, and therefore the red, green, and blue luminance-value ratios of each pixel of the at least one point light-source pixel region show color differences of the corresponding pixel under the same brightness condition.

After ascertaining the red, green, and blue luminance-value ratios of each pixel of the at least one point light-source pixel region, the image corrector 103 generates, based on the red, green, and blue luminance-value ratios of each pixel of the at least one point light-source pixel region, a local corrected image of the at least one point light-source pixel region.

Additionally, as described above, the image corrector 103 performs the regular generation task to accordingly generate a remaining corrected image of the remaining region, except for the at least one point light-source pixel region, included in the digital view image in accordance with (I) The measured color luminance value for each pixel of the remaining region (II) A first other-color luminance value for the corresponding pixel, which is calculated based on the average value of measured luminance values of first other-color pixels located adjacently around the corresponding pixel (III) A second other-color luminance value for the corresponding pixel, which is calculated based on the average value of measured luminance values of second other-color pixels located adjacently around the corresponding pixel The image corrector 103 can perform known tone curve adjustment on the remaining corrected image of the remaining region of the digital view image if necessity arises.

The image corrector 103 combines the local corrected image with the remaining corrected image to accordingly generate a modified corrected image.

That is, the image corrector 103 is configured to generate, based on the digital view image captured by each of the first and second vehicular cameras 20a1 and 20a2, any one of (I) The regular corrected image if it is determined that the digital view image is captured during the other time periods except for the night time period or it is determined that there are no point light sources in the field of view of the digital view image (II) The modified corrected image otherwise if it is determined that the digital view image is captured during the night time period and that there is at least one point light source in the field of view of the digital view image The regular corrected image and the modified corrected image of the digital view image captured by the first vehicular camera 20a1 will also be referred to respectively as a first regular corrected image and a first modified corrected image. Similarly, the regular corrected image and the modified corrected image of the digital view image captured by the second vehicular camera 20a2 will also be referred to respectively as a second regular corrected image and a second modified corrected image.

The determiner 104 is configured to perform any one of a first comparison task of comparing the first regular corrected image with the second regular corrected image, and a second comparison task of comparing the first modified corrected image with the second modified corrected image.

The first comparison task also includes a task of (I) Calculating, based on a result of the comparison, a difference between each of the red, green, and blue luminance-value ratios of each pixel of the first regular corrected image and the corresponding one of the red, green, and blue luminance-value ratios of the corresponding pixel of the second regular corrected image (II) Determining whether the calculated difference between each of the red, green, and blue luminance-value ratios of each pixel of the first regular corrected image and the corresponding one of the red, green, and blue luminance-value ratios of the corresponding pixel of the second regular corrected image lies within a predetermined threshold range (III) Determining that each of the first and second regular corrected images is an error-free corrected image, thus determining that the first and second cameras 20a1 and 20a2 can operate normally, upon determination that the calculated difference between each of the red, green, and blue luminance-value ratios of each pixel of the first regular corrected image and the corresponding one of the red, green, and blue luminance-value ratios of the corresponding pixel of the second regular corrected image lies within the predetermined threshold range (IV) Determining that at least one of the first and second regular corrected images is an error corrected image, thus determining that at least one of the first and second cameras 20a1 and 20a2 has malfunctioned, upon determination that the calculated difference between at least one of the red, green, and blue luminance-value ratios of at least one pixel of the first regular corrected image and at least one of the red, green, and blue luminance-value ratios of the corresponding at least one pixel of the second regular corrected image lies outside the predetermined threshold range The second comparison task also includes a task of (I) Calculating, based on a result of the comparison, a difference between each of the red, green, and blue luminance-value ratios of each pixel of the first modified corrected image and the corresponding one of the red, green, and blue luminance-value ratios of the corresponding pixel of the second modified corrected image (II) Determining whether the calculated difference between each of the red, green, and blue luminance-value ratios of each pixel of the first modified corrected image and the corresponding one of the red, green, and blue luminance-value ratios of the corresponding pixel of the second modified corrected image lies within a predetermined threshold range (III) Determining that each of the first and second modified corrected images is an error-free corrected image, thus determining that the first and second cameras 20a1 and 20a2 can operate normally, upon determination that the calculated difference between each of the red, green, and blue luminance-value ratios of each pixel of the first modified corrected image and the corresponding one of the red, green, and blue luminance-value ratios of the corresponding pixel of the second modified corrected image lies within the predetermined threshold range (IV) Determining that at least one of the first and second modified corrected images is an error corrected image is an error corrected image, thus determining that at least one of the first and second cameras 20a1 and 20a2 has malfunctioned, upon determination that the calculated difference between at least one of the red, green, and blue luminance-value ratios of at least one pixel of the first modified corrected image and at least one of the red, green, and blue luminance-value ratios of the corresponding at least one pixel of the second modified corrected image lies outside the predetermined threshold range The output unit 105 is configured to output, to the image display device 40 and the cruise assist apparatus 50, both the first and second regular corrected images or both the first and second modified corrected images.

The image display device 40 is configured to display both the first and second regular corrected images or both the first and second modified corrected images.

The cruise assist apparatus 50 is configured to receive both the first and second regular corrected images or both the first and second modified corrected images, and perform, based on the received first and second regular corrected images or received first and second modified corrected images, the cruise assist task set forth above.

Figure 10A:
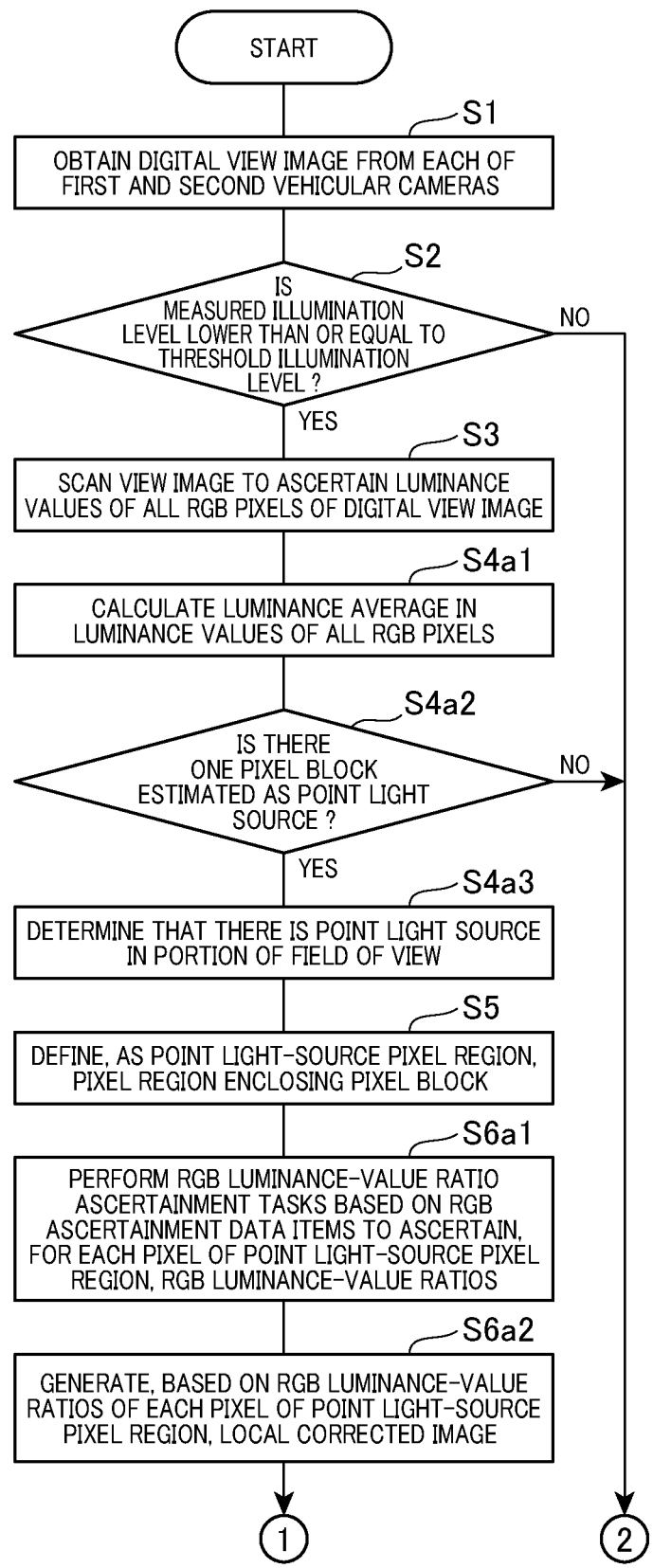
FIG. 10A is a first part of a flowchart schematically illustrating a predetermined image-processing algorithm to be carried out by a CPU of the image processing apparatus illustrated in FIG. 1 according to the exemplary embodiment of the present disclosure.

Next, the following describes a predetermined image-processing algorithm based on the program instructions of the one or more programs stored in the storage unit 12; the algorithm is carried out by the image processing apparatus 10, i.e., the CPU 11 thereof, with reference to FIG. 10. For example, the image processing apparatus 10, i.e., the CPU 11 thereof, is programmed to start the image-processing algorithm every predetermined control cycle.

When starting the image-processing algorithm, the CPU 11 of the image processing apparatus 10 serves as, for example, the image obtainer 101 to instruct each of the first and second vehicular cameras 20a1 and 20a2 to output, to the CPU 11, the corresponding one of the digital view images captured by the first and second vehicular cameras 20a1 and 20a2, thus obtaining the digital view images captured by the first and second vehicular cameras 20a1 and 20a2 in step S1. That is, the digital view image captured by each of the first and second vehicular cameras 20a1 and 20a2 is comprised of the digital red, green, and blue pixels, i.e., the digital red, green, and blue luminance values described above.

Next, the CPU 11 serves as, for example, the illumination-level determiner to obtain the illumination measurement signal indicative of the measured illumination level around the vehicle V outputted from the illumination level sensor 30 in step S2. Then, the CPU 11 serves as, for example, the illumination-level determiner 102 to compare the measured illumination level around the vehicle V with the predetermined threshold illumination level, thus determining whether the measured illumination level around the vehicle V is lower than or equal to the predetermined threshold illumination level in step S2. In other words, the CPU 11 serves as, for example, the illumination-level determiner 102 to determine whether each of the digital view images obtained by the image obtainer 101 is captured during the night-time period.

Upon determination that the measured illumination level around the vehicle V is lower than or equal to the predetermined threshold illumination level (YES in step S2), that is, each of the digital view images obtained by the image obtainer 101 is captured during the night-time period (YES in step S2), the image processing algorithm proceeds to step S3.

In step S3, the CPU 11 serves as, for example, the image corrector 103 to perform the point light-source determination task of scanning all the RGB pixels of the digital view image from the left upper pixel to the right lower pixel to thereby ascertain the luminance values of all the RGB pixels of the digital view image.

Next, the CPU 11 serves as, for example, the image corrector 103 to perform the point light-source determination task of calculating a luminance average in the luminance values of all the RGB pixels of the digital view image in step S4a1, and determining whether there is at least one pixel-block based on at least one point light source in step S4a2.

Specifically, in step S4a2, the CPU 11 serves as the image corrector 103 to determine whether there is at least one pixel-block of one or more pixels in all the RGB pixels; the luminance values of the one or more pixels of the at least one pixel-block are higher by at least the predetermined threshold value than the average luminance.

Upon determination that there is at least one pixel-block of one or more pixels in all the RGB pixels whose luminance values are higher by at least the predetermined threshold value than the average luminance, the CPU 11 serves as, for example, the image corrector 103 to perform the point light-source determination task of determining whether the size of the at least one pixel-block is smaller than or equal to the predetermined several pixels, for example, three pixels in step S4a2.

Upon determination that the size of the at least one pixel-block is smaller than or equal to the predetermined several pixels, for example, three pixels (YES in step S4a2), the CPU 11 serves as, for example, the image corrector 103 to perform the point light-source determination task of determining that there is at least one point light source in a portion of the field of view; the portion corresponds to the at least one pixel-block included in the digital view image in step S4a3.

Next, the CPU 11 serves as, for example, the image corrector 103 to define, as at least one point light-source pixel region, at least one predetermined pixel region enclosing the at least one pixel-block in step S5. For example, the CPU 11 serves as the image corrector 103 to define, as the at least one point light-source pixel region in the digital view image, at least one pixel-matrix region, which is centered around the at least one pixel-block, and comprised of 5 pixels in the horizontal direction and 5 pixels in the vertical direction, referred to as a (5×5) array of pixels in step S5.

Next, in step S6a1, the CPU 11 serves as, for example, the image corrector to perform, as described above, (I) The red luminance-value ratio ascertainment task based on the red ascertainment data item stored in the storage unit 12 assuming that all pixels of the at least one point light-source pixel region are red pixels to accordingly ascertain, for each pixel of the at least one point light-source pixel region, the red luminance-value ratio (II) The green luminance-value ratio ascertainment task based on the green ascertainment data item stored in the storage unit 12 assuming that all pixels of the at least one point light-source pixel region are green pixels to accordingly ascertain, for each pixel of the at least one point light-source pixel region, the green luminance-value ratio (III) The blue luminance-value ratio ascertainment task based on the blue ascertainment data item stored in the storage unit 12 assuming that all pixels of the at least one point light-source pixel region are blue pixels to accordingly ascertain, for each pixel of the at least one point light-source pixel region, the blue luminance-value ratio Then, in step S6a2, the CPU 11 serves as, for example, the image corrector to generate, based on the red, green, and blue luminance-value ratios of each pixel of the at least one point light-source pixel region, a local corrected image of the at least one point light-source pixel region.

Following the operation in step S6a2, the CPU 11 serves as, for example, the image corrector 103 to perform, in step S7a1 of step S7, the regular generation task to accordingly generate a remaining corrected image of the remaining region, except for the at least one point light-source pixel region, included in the digital view image in accordance with (I) The measured color luminance value, such as a measured red luminance value, for each pixel, such as each red pixel, of the remaining region (II) A first other-color luminance value, such as a green luminance value, for the corresponding pixel, which is calculated based on the average value of measured luminance values of first other-color pixels, such as green pixels, located adjacently around the corresponding pixel (III) A second other-color luminance value, such as a blue luminance value, for the corresponding pixel, which is calculated based on the average value of measured luminance values of second other-color pixels, such as blue pixels, located adjacently around the corresponding pixel In step S7a1, the image corrector 103 can perform the known tone curve adjustment on the remaining corrected image of the remaining region of the digital view image if necessity arises.

Then, the CPU 11 serves as, for example, the image corrector 103 to combine the local corrected image with the remaining corrected image to accordingly generate a modified corrected image in step S7a2 of step S7.

Otherwise, upon determination that the measured illumination level around the vehicle V is higher than the predetermined threshold illumination level (NO in step S2), that is, each of the digital view images obtained by the image obtainer 101 is captured during the other time periods, such as the daytime period (NO in step S2), the image processing algorithm proceeds to step S7a3 of step S7.

Additionally, upon determination that (I) there are no pixel-blocks of one or more pixels in all the RGB pixels whose luminance values are higher by the at least the predetermined threshold value than the average luminance (NO in step S4a2) or (II) the size of the at least one pixel-block is larger than the several pixels, for example, three pixels (NO in step S4a2), the image processing algorithm proceeds to step S7a3 of step S7.

In step S7a3 of step S7 in response to negative determination in step S2 or S4a2, the CPU 11 serves as, for example, the image corrector 103 to perform, as described above, the regular generation task to accordingly generate a regular corrected image for the digital view image in accordance with (I) The measured color luminance value, such as a measured red luminance value, for each pixel, such as each red pixel, of the digital view image (II) A first other-color luminance value, such as a green luminance value, for the corresponding pixel, which is calculated based on the average value of measured luminance values of first other-color pixels, such as green pixels, located adjacently around the corresponding pixel (III) A second other-color luminance value, such as a blue luminance value, for the corresponding pixel, which is calculated based on the average value of measured luminance values of second other-color pixels, such as blue pixels, located adjacently around the corresponding pixel In step S7, the image corrector 103 can perform the known tone curve adjustment on the regular corrected image of the digital view image if necessity arises.

The above operations in steps S2 to S7 are carried out for each of the digital view images captured by the first and second vehicular cameras 20a1 and 20a2. For this reason, before the operation in step S8, the modified corrected image or the regular corrected image for the first vehicular camera 20a1 is generated, which will be referred to as a first modified corrected image or a first regular corrected image. Additionally, before the operation in step S8, the modified corrected image or the regular corrected image for the second vehicular camera 20a2 is generated, which will be referred to as a second modified corrected image or a second regular corrected image.

In step S8, the CPU 11 serves as, for example, the determiner 104 to perform the first comparison task of comparing the first regular corrected image with the second regular corrected image in step S8a1 of step S8 to accordingly determine whether each of the first and second regular corrected images is an error-free corrected image in step S8a2 of step S8.

Similarly, the CPU 11 serves as, for example, the determiner 104 to perform the second comparison task of comparing the first modified corrected image with the second modified corrected image in step S8a3 of step S8 to accordingly determine whether each of the first and second modified corrected images is an error-free corrected image in step S84a of step S8.

Upon determination by the first comparison task that at least one of the first and second regular corrected images is an error corrected image (NO in step S8a2), the CPU 11 terminates the image-processing algorithm. Similarly, upon determination by the second comparison task that at least one of the first and second modified corrected images is an error corrected image (NO in step S8a4), the CPU 11 terminates the image-processing algorithm.

Alternatively, upon the negative determination in step S8*a*2 or S8*a*4, the CPU serves as the output unit 105 to output, to the cruise assist apparatus 50, information representing that at least one of the first and second regular corrected images or at least one of the first and second modified corrected images is an error corrected image, and thereafter terminates the image-processing algorithm.

Otherwise, upon determination by the first comparison task that each of the first and second regular corrected images is an error-free corrected image (YES in step S8*a*2), the CPU 11 serves as, for example, the output unit 105 to output, to the image display device 40 and the cruise assist apparatus 50, both the first and second regular corrected images in step S9, and thereafter, terminates the image-processing algorithm.

Similarly, upon determination by the second comparison task that each of the first and second modified corrected images is an error-free corrected image (YES in step S8*a*4), the CPU 11 serves as, for example, the output unit 105 to output, to the image display device 40 and the cruise assist apparatus 50, both the first and second modified corrected images in step S9, and thereafter, terminates the image-processing algorithm.

As described in detail set forth above, the image processing apparatus 10 according to the exemplary embodiment is configured to (I) Measure, for each color, the luminance values of the corresponding color pixels included in the at least one point light-source pixel region (II) Ascertain, for each color, a corresponding color luminance-value ratio for each pixel of the at least one point light-source pixel region in accordance with the measured luminance values of the corresponding color pixels included in the at least one point light-source pixel region and the ascertainment data item of the corresponding color This configuration therefore obtains, for each color, the luminance-value ratio for each pixel of the at least one point light-source pixel region independently of the color-sensitivity difference caused by the color filter unit 23, resulting in the respective color, i.e., the red-, green-, and blue-color, luminance-value ratios of each pixel of the at least one point light-source pixel region showing color differences of the corresponding pixel under the same brightness condition.

This therefore makes it possible to improve the accuracy of ascertaining the RGB luminance-value ratios for each pixel of each of the first and second modified corrected images, thus improving the accuracy of estimating an actual color of each pixel of each of the first and second modified corrected images in accordance with the RGB luminance-value ratios for the corresponding pixel of the corresponding one of the first and second modified corrected images.

Additionally, the image processing system 100 according to the exemplary embodiment includes the image processing apparatus 10 and the first and second vehicular cameras 20*a*1 and 20*a*2, and the first and second vehicular cameras 20*a*1 and 20*a*2 capture an image of the same field of view in front of the vehicle V.

Then, the image obtainer 101 is configured to obtain, from each of the first and second vehicular cameras 20*a*1 and 20*a*2, a digital view image based on the image captured by the corresponding one of the first and second vehicular cameras 20*a*1 and 20*a*2.

Next, as described above, the image corrector 103 is configured to generate (I) First and second regular corrected image s upon determination that the digital view image obtained by the image obtainer 101 is captured during the other time periods other than the night-time period, or that there are no point light sources in the field of view (II) First and second modified corrected images upon determination that the digital view image obtained by the image obtainer 101 is captured during the night-time period and that there is at least one point light-source in the field of view of the corresponding one of the first and second vehicular cameras 20*a*1 and 20*a*2

Then, the determiner 104 is configured to perform the first comparison task of comparing the first regular corrected image with the second regular corrected image to accordingly determine whether the calculated difference between each of the red, green, and blue luminance-value ratios of each pixel of the first regular corrected image and the corresponding one of the red, green, and blue luminance-value ratios of the corresponding pixel of the second regular corrected image lies within the predetermined threshold range.

Upon determination that the calculated difference between each of the red, green, and blue luminance-value ratios of each pixel of the first regular corrected image and the corresponding one of the red, green, and blue luminance-value ratios of the corresponding pixel of the second regular corrected image lies within the predetermined threshold range, the determiner 104 determines that each of the first and second regular corrected images is an error-free corrected image, thus determining that the first and second cameras 20*a*1 and 20*a*2 can operate normally. Otherwise, upon determination that the calculated difference between at least one of the red, green, and blue luminance-value ratios of at least one pixel of the first regular corrected image and at least one of the red, green, and blue luminance-value ratios of the corresponding at least one pixel of the second regular corrected image lies outside the predetermined threshold range, the determiner 104 determines that at least one of the first and second regular corrected images is an error corrected image, thus determining that at least one the first and second cameras 20*a*1 and 20*a*2 has malfunctioned.

Similarly, upon determination that the calculated difference between each of the red, green, and blue luminance-value ratios of each pixel of the first modified corrected image and the corresponding one of the red, green, and blue luminance-value ratios of the corresponding pixel of the second modified corrected image lies within the predetermined threshold range, the determiner 104 determines that each of the first and second modified corrected images is an error-free corrected image, thus determining that the first and second cameras 20*a*1 and 20*a*2 can operate normally. Otherwise, upon determination that the calculated difference between at least one of the red, green, and blue luminance-value ratios of at least one pixel of the first modified corrected image and at least one of the red, green, and blue luminance-value ratios of the corresponding at least one pixel of the second modified corrected image lies outside the predetermined threshold range, the determiner 104 determines that at least one of the first and second modified corrected images is an error corrected image, thus determining that at least one the first and second cameras 20*a*1 and 20*a*2 has malfunctioned.

This therefore makes it possible to diagnose whether each of the first and second vehicular cameras 20*a*1 and 20*a*2 can operate normally while ensuring a higher level of the robustness of the image processing system 100.

The image corrector 103 according to the exemplary embodiment is configured to determine at least one point light-source pixel region included in the digital view image;

the determined at least one light-source pixel region corresponds to the location of at least one point light source in the digital view image.

Then, the image corrector 103 is configured to estimate, for each of color-pixels included in the at least one point light-source pixel area, which no corresponding color-filtered light enters, a corresponding color luminance-value ratio in accordance with measured corresponding color luminance-value ratios of pixels included in the at least one point light-source pixel area and the corresponding color ascertainment data item. This configuration enables the image corrector 103 to generate a local corrected image of the at least one point light-source pixel region.

As compared with a comparative configuration that the image corrector 103 generates a corrected image of the digital view image using the luminance-value correction data item for each color, this configuration makes it possible to improve the accuracy of ascertaining an RGB luminance-value ratio for each pixel of the at least one point light-source pixel region included in the digital view image while reducing the processing load of the CPU 11.

OTHER EMBODIMENTS MODIFICATIONS

The exemplary embodiment of the present disclosure has been described, but the present disclosure is not limited to the above exemplary embodiment, and can be variably modified within the scope of the present disclosure.

The exemplary embodiment uses a vehicle as an example of a mobile object, but can use another mobile object, such as a train.

The exemplary embodiment uses the luminance-value ratio distribution illustrated in FIG. 5, which is previously prepared for each color, stored in the storage unit 12 as the green ascertainment data item, but the present disclosure can use the relational expression [eq1] for each color luminance-value ratio of any pixel in the digital view image.

The exemplary embodiment applies the ascertainment data item for each color to the at least one point light-source pixel area included in the digital view image, but can apply the ascertainment data item for each color to whole of the digital view image to accordingly ascertain luminance-value ratios of respective pixels of the digital view image. Because this modification may be likely to increase the processing load of the CPU 11, it is preferable to apply the ascertainment data item for each color to the at least one point light-source pixel area included in the digital view image.

The ascertainment data item for each color can be stored in the storage unit or installed in the image-processing algorithm or installed in the CPU 11.

The image processing apparatuses and image processing methods described in the present disclosure can be implemented by a dedicated computer including a memory and a processor programmed to perform one or more functions embodied by one or more computer programs.

The image processing apparatuses and image processing methods described in the present disclosure can also be implemented by a dedicated computer including a processor comprised of one or more dedicated hardware logic circuits.

The image processing apparatuses and image processing methods described in the present disclosure can further be implemented by a processor system comprised of a memory, a processor programmed to perform one or more functions embodied by one or more computer programs, and one or more hardware logic circuits.

The one or more programs can be stored in a non-transitory storage medium as instructions to be carried out by a computer or a processor. One or more functions included in each of the image processing apparatuses disclosed in the present disclosure can be implemented by one or more programmed logic circuits, one or more hardwired logic circuits, and/or one or more hardwired-logic and programmable-logic hybrid circuits.

The functions of one element in each embodiment can be distributed as plural elements, and the functions that plural elements have can be combined into one element. At least part of the structure of each embodiment can be replaced with a known structure having the same function as the at least part of the structure of the corresponding embodiment. A part of the structure of each embodiment can be eliminated. All aspects included in the technological ideas specified by the language employed by the claims constitute embodiments of the present disclosure.

The present disclosure can be implemented by various embodiments in addition to the image processing apparatus; the various embodiments include systems each including the image processing apparatus, programs for serving a computer as the image processing apparatus, storage media, such as non-transitory storage media, storing the programs, image processing methods, and cruise assist methods.

While the illustrative embodiments of the present disclosure have been described herein, the present disclosure is not limited to the embodiments described herein, but includes any and all embodiments having modifications, omissions, combinations (e.g., of aspects across various embodiments), adaptations and/or alternations as would be appreciated by those having ordinary skill in the art based on the present disclosure. The limitations in the claims are to be interpreted broadly based on the language employed in the claims and not limited to examples described in the present specification or during the prosecution of the application, which examples are to be construed as non-exclusive.

What is claimed is:
1. An image processing apparatus comprising:
 an image obtainer configured to obtain, from an imaging unit including a color filter unit, an image captured by the imaging unit, the color filter unit including of a plurality of color filters whose colors are different from each other, the image including a plurality of pixels arranged to respectively correspond to the color filters, each of the plurality of pixels having a corresponding color luminance value;
 an illumination-level determiner configured to:
  measure an illumination level around the imaging unit; and
  determine whether the measured illumination level around the camera is lower than or equal to a predetermined threshold illumination level; and
 an image corrector configured to perform, for the image, a corrected-image generation task of ascertaining, for each pixel of a selected pixel region included in the image, luminance-value ratios of the respective colors of the color filters in accordance with (i) the color luminance value of the corresponding pixel of the selected pixel region, and (ii) ascertainment data items predetermined for the respective colors if it is determined that the measured illumination level around the imaging unit is lower than or equal to the predetermined threshold illumination level,
 the ascertainment data item, predetermined for each of the colors, representing a corresponding color luminance-value ratio at any pixel in the selected pixel region included in the image with respect to a predetermined peak luminance value of the corresponding one of the colors in the selected pixel region; and generate a corrected image in accordance with the luminance-value ratios of the respective colors ascertained for each pixel of the selected pixel region.

2. The image processing apparatus according to claim 1, wherein:
the selected region has a size that is smaller than a whole size of the image.

3. The image processing apparatus according to claim 1, wherein:
the selected region has a size that is substantially identical to a whole size of the image.

4. The image processing apparatus according to claim 1, wherein:
the image obtainer is configured to obtain, from the imaging unit that is installed in a mobile object, a view image from the mobile object as the image captured by the imaging unit, the image processing further comprising:
an output unit configured to output, to an external device, the corrected image; and
a storage unit configured to store each of the ascertainment data items.

5. The image processing apparatus according to claim 1, wherein:
the image obtainer is configured to obtain, from a first imaging unit and a second imaging unit that have a common field of view, both:
a first image as the image captured by the first imaging unit serving as the imaging unit; and
a second image as the image captured by the second imaging unit serving as the imaging unit; and
the image corrector is configured to:
perform, for each of the first and second images, the corrected-image generation task to accordingly generate a first corrected image as the corrected image and a second corrected image as the corrected image;
perform a comparison between the first corrected image and the corrected image to accordingly calculate, based on the comparison between the first corrected image and the corrected image, a difference between each of the luminance-value ratios of the respective colors for each pixel of the first corrected image and the corresponding one of the luminance-value ratios of the corresponding respective colors for the corresponding pixel of the second corrected image;
determine whether the calculated difference between each of the luminance-value ratios of the respective colors for each pixel of the first corrected image and the corresponding one of the luminance-value ratios of the corresponding respective colors for the corresponding pixel of the second corrected image lies within a predetermined threshold range;
determine that each of the first and second corrected images is an error-free corrected image in response to determination that the calculated difference between each of the luminance-value ratios of the respective colors for each pixel of the first corrected image and the corresponding one of the luminance-value ratios of the corresponding respective colors for the corresponding pixel of the second corrected image lies within the predetermined threshold range; and determine that at least one of the first and second corrected images is an error corrected image in response to determination that the calculated difference between the luminance-value ratio of at least one of the colors for at least one pixel of the first corrected image and the corresponding luminance-value ratio of a corresponding at least one color for a corresponding at least one pixel of the second corrected image lies outside the predetermined threshold range.

6. The image processing apparatus according to claim 1, wherein:
the image obtainer is configured to obtain, from the imaging unit, an image of a field of view of the imaging unit captured by the imaging unit; and
the image corrector is configured to:
determine, based on the luminance values of the pixels of the image, whether there is a point light source in a portion of the field of view, the portion corresponding to a pixel block in the image;
define, in response to determination that there is a point light source in the portion of the field of view, a point light-source pixel region enclosing the pixel block of the image as the selected pixel region; and
perform, for the image, the corrected-image generation task of ascertaining, for each pixel of the point light-source pixel region as the selected pixel region, the luminance-value ratios of the respective colors of the color filters.

7. The image processing apparatus according to claim 1, wherein:
the ascertainment data item predetermined for each color represents a luminance-value ratio distribution for the corresponding color, and the luminance-value ratio distribution for each color has the peak luminance value for the corresponding color at a particular pixel in the selected pixel region, and exponentially decreases from the peak luminance value for the corresponding color with distance of other pixels in the selected pixel region from the particular pixel.

8. The image processing apparatus according to claim 1, wherein:
the ascertainment data item predetermined for each color represents a relational expression for the corresponding color, and the relational expression for each color is designed to exponentially decrease from the peak luminance value at a particular pixel in the selected pixel region for the corresponding color with distance of other pixels in the selected pixel region from the particular pixel.

* * * * *